United States Patent
Cazenave et al.

(10) Patent No.: US 9,456,547 B2
(45) Date of Patent: Oct. 4, 2016

(54) SUGARCANE CLEANING DEFLECTOR ARRANGEMENTS

(71) Applicant: DEERE & COMPANY, Moline, IL (US)

(72) Inventors: Blain J. Cazenave, Vacherie, LA (US); Dusk S. Mixon, Saint Amant, LA (US); Mingyong Chen, Bettendorf, IA (US)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/695,441

(22) Filed: Apr. 24, 2015

(65) Prior Publication Data

US 2015/0327438 A1    Nov. 19, 2015

Related U.S. Application Data

(60) Provisional application No. 61/993,913, filed on May 15, 2014.

(51) Int. Cl.
*A01D 46/00* (2006.01)
*A01D 87/10* (2006.01)
*A01D 45/10* (2006.01)

(52) U.S. Cl.
CPC ..................... *A01D 45/10* (2013.01)

(58) Field of Classification Search
CPC .... A01D 45/10; A01D 45/00; A01F 12/444; B01D 45/14
USPC ............................ 56/12.8, 13.3; 460/99, 100
See application file for complete search history.

(56) References Cited

U.S. PATENT DOCUMENTS

| | | | | |
|---|---|---|---|---|
| 3,482,690 A * | 12/1969 | Driller | ................... | A01D 45/00 209/147 |
| 3,788,048 A * | 1/1974 | Stiff | ....................... | B01D 45/14 209/250 |
| 3,813,184 A * | 5/1974 | Temple | .................... | F04D 17/04 415/144 |
| 3,830,046 A * | 8/1974 | Rollitt | .................... | A01D 45/10 55/416 |
| 3,833,006 A * | 9/1974 | Temple | ................. | A01F 12/444 415/148 |
| 4,270,337 A * | 6/1981 | Pinto | ..................... | A01D 45/10 56/13.9 |
| 4,555,896 A * | 12/1985 | Stiff | ....................... | A01D 45/10 56/13.9 |
| 4,924,662 A * | 5/1990 | Quick | .................... | A01D 45/10 56/12.8 |
| 5,031,392 A * | 7/1991 | Baker | .................... | A01D 45/10 460/123 |
| 5,092,110 A * | 3/1992 | Dommert | ............... | A01D 45/10 209/139.1 |
| 5,953,891 A * | 9/1999 | Leigers | .................. | A01D 45/10 460/99 |
| 6,076,340 A * | 6/2000 | Fowler | ................... | A01D 45/10 56/13.3 |
| 6,272,819 B1 * | 8/2001 | Wendte | ................ | A01D 41/127 460/6 |
| 6,363,700 B1 | 4/2002 | Fowler | | |
| 6,869,356 B2 * | 3/2005 | Hinds | .................... | A01D 45/10 460/70 |

* cited by examiner

*Primary Examiner* — Árpád Fábián-Kovács
(74) *Attorney, Agent, or Firm* — Lorenz & Kopf. LLP

(57) ABSTRACT

A cleaning arrangement for a sugarcane harvester with a cleaning chamber includes a deflector body with at least one deflection surface at least partly facing a feed stream of cane billets and other material from a feed train of a sugarcane harvester. The deflector body may be fixed to the sugarcane harvester such that the at least one deflection surface extends at least partly within the cleaning chamber. As the feed train moves the feed stream to the cleaning chamber, the at least one deflection surface may deflect at least a portion of the feed stream within the cleaning chamber.

20 Claims, 14 Drawing Sheets

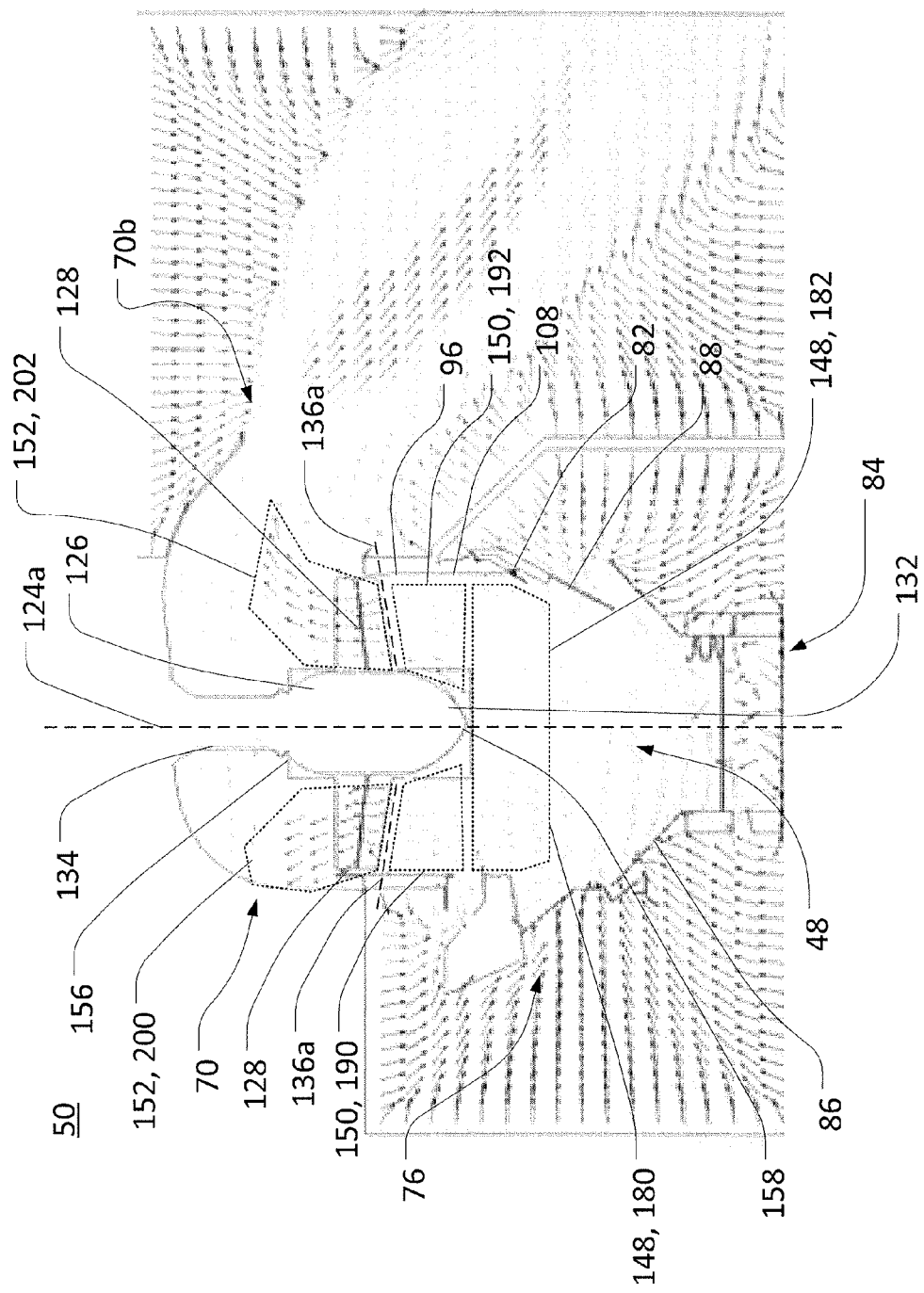

SUGARCANE CLEANING DEFLECTOR ARRANGEMENTS

CROSS-REFERENCE TO RELATED APPLICATION(S)

This application claims priority to U.S. provisional application 61/993,913, which was filed May 15, 2014.

STATEMENT OF FEDERALLY SPONSORED RESEARCH OR DEVELOPMENT

Not applicable.

FIELD OF THE DISCLOSURE

This disclosure relates generally to sugarcane harvesting, including the cleaning of leaves and debris from a stream of sugarcane billets.

BACKGROUND OF THE DISCLOSURE

In order to harvest sugarcane from a field, a sugarcane harvester may move along a sugarcane field in order to gather sugarcane plants for further processing. The sugarcane plants may be severed from the ground by a base cutter assembly, then transported by feed rollers to a set of chopping drums, in order to be chopped into billets. The chopped plant matter may pass from the chopping drums into a trash extractor, which may clean the billet stream of leaves, dirt, or other trash. An output stream of billets may then pass from the extractor to a conveyer, which may lift the billets into a trailing wagon.

Various existing sugarcane harvesters may utilize axial-flow fans to generate air flow through the extractor, in order to clean leaves, dirt and other trash from streams of sugarcane billets. Traditional extractor designs, however, may be relatively inefficient and expensive, and may result in significant losses of sugarcane billets as well as relatively poor trash extraction.

SUMMARY OF THE DISCLOSURE

Deflectors and related cleaning arrangements are disclosed for separating cane billets from other material. According to one aspect of the disclosure, a deflector body may include a deflection surface facing a feed stream from a feed train of a sugarcane harvester. The deflector body may be fixed to the sugarcane harvester such that the deflection surface extends at least partly within a cleaning chamber of the sugarcane harvester. As the feed train moves the feed stream to the cleaning chamber, the deflection surface may deflect at least a portion of the feed stream within the cleaning chamber.

According to another aspect of the disclosure, a deflector body may include a deflection surface facing a feed stream from a feed train of a sugarcane harvester. The deflector body may be fixed to the sugarcane harvester such that the deflection surface extends at least partly within a cleaning chamber of the sugarcane harvester. As the feed train moves the feed stream to the cleaning chamber, the deflection surface may deflect at least a portion of the feed stream along a deflected path within the cleaning chamber.

According to still another aspect of the disclosure, a deflector body may include a deflection surface facing a feed stream from a feed train of a sugarcane harvester. The deflector body may be fixed to the sugarcane harvester such that the deflection surface extends at least partly within a cleaning chamber of the sugarcane harvester. As the feed train moves the feed stream to the cleaning chamber, the deflection surface may deflect at least a portion of the feed stream along a deflected path within the cleaning chamber. A hub cover for a fan of the sugarcane harvester may extend within the cleaning chamber, with at least a portion of the hub cover extending into the deflected path of the feed stream. The deflection of the portion of the feed stream by the deflector body may cause the portion of the feed stream to physically impact the hub cover.

A guide vane may be disposed at a perimeter of the cleaning chamber. The guide vane may include a guide surface that at least partly faces the fan blades, the guide surface being oriented such that one of the rotating fan blades, in a single rotation, passes a higher end of the guide surface before passing a lower end of the guide surface. As part of the feed stream is carried by an air flow within the cleaning chamber toward an outlet of the cleaning chamber, the guide surface or an impact surface of the guide vane may deflect part of the feed stream away from the outlet.

The details of one or more implementations are set forth in the accompanying drawings and the description below. Other features and advantages will become apparent from the description, the drawings, and the claims.

BRIEF DESCRIPTION OF THE DRAWINGS

FIGS. 7A and 7B depict velocity vectors of an example air flow through the trash extractor of FIG. 1;

Like reference symbols in the various drawings indicate like elements.

DETAILED DESCRIPTION

Figure 1:
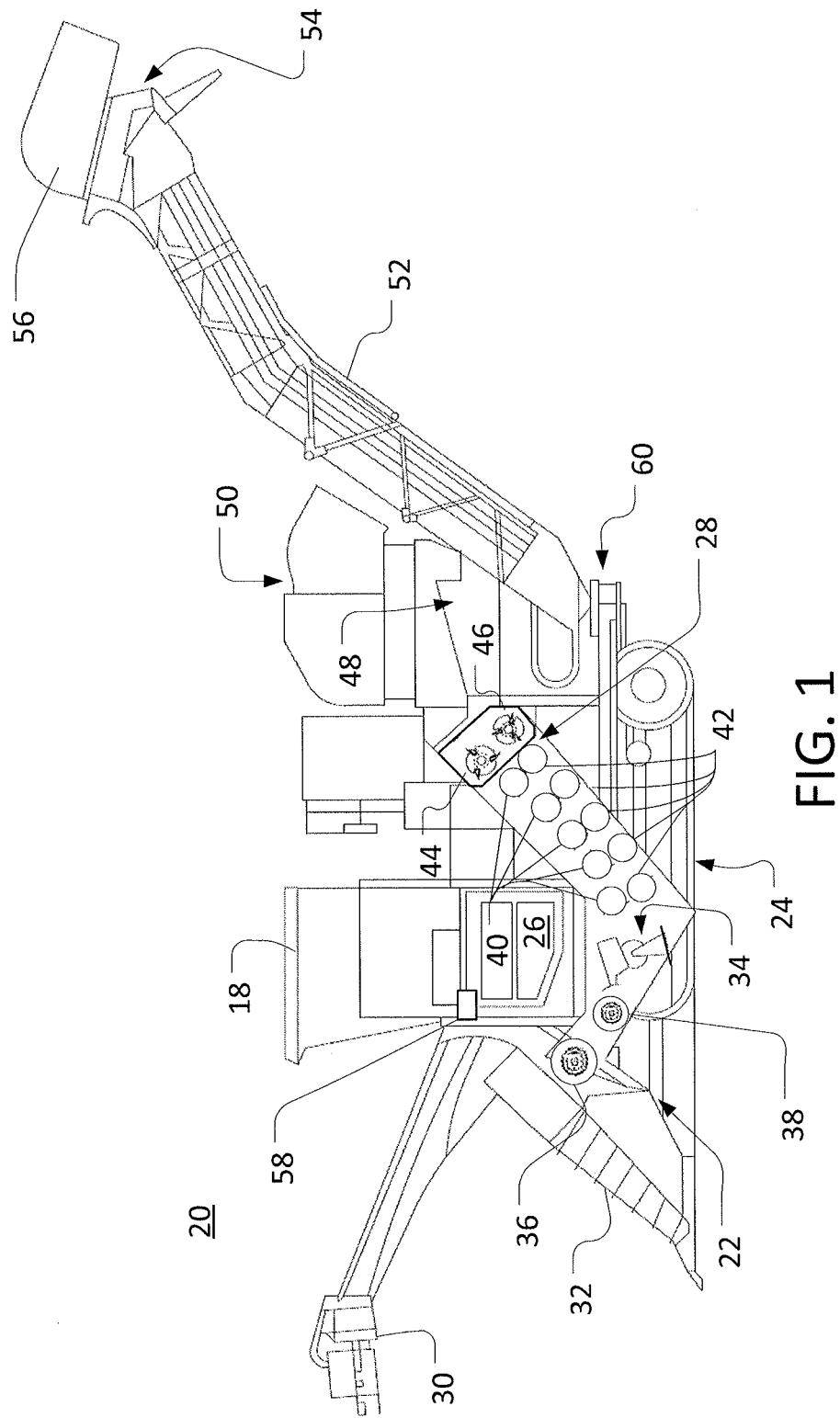
FIG. 1 is a simplified elevational view of an example sugarcane harvester with a trash extractor.

The following describes one or more example embodiments of the disclosed extractor and cleaning method for sugarcane harvesters, as shown in the accompanying figures of the drawings described briefly above. Various modifications to the example embodiments may be contemplated by one of skill in the art.

As used herein, unless otherwise specified or limited, "fixed," "connected," "attached," "supported," "coupled" and similar terms are used broadly, and generally include both direct and indirect fixing, connection, attachment, support, coupling, and so on. Also as used herein, unless otherwise specified or limited, a "body" may include a single-piece body, or a multiple-piece body, with various of multiple pieces being attached in various ways (e.g., via welding, mechanical fasteners such as clips, screws, tabs, or detent devices, and so on) to form the multiple-piece body.

As noted above, fan-based trash extractors may sometimes be utilized to clean trash (e.g., leaves, dirt, and other debris) from a stream of cut sugarcane plants. Generally, a vertical (or other) fan may be utilized to establish a pressure differential between an upper hood of the extractor and a lower cleaning chamber, and thereby generate a flow field (i.e., an air flow of air drawn from the surroundings) within the extractor as a whole. Because trash may tend to be lighter or less dense than billets of sugarcane stalks (i.e., "cane billets"), this pressure differential and flow field may tend to lift the trash into the hood for ejection, while allowing the cane billets to fall though an outlet opening for further processing by the harvester.

Generally, a goal of trash extraction (or "cleaning") may be the removal of a relatively high proportion of trash from a stream of plant (and other) material, with relatively little removal of cane billets. In this regard, successful extraction may result in highly clean flow of cane billets from an extractor, where the "cleanness" of an the flow of billets may be viewed as a proportion of an outlet flow that is cane billets (and not trash). Similarly, successful extraction may also result in relatively few of the cane billets being ejected from the extractor with the trash. In this regard, successful extraction may result in low-loss ejection streams, where the "loss" of an extraction operation may be viewed as a proportion of the ejected material that is cane billets. As with other mechanized processes, it may be desirable to achieve highly clean outlet flows and low-loss ejection streams with relatively efficient expenditure of system energy.

The extractor (and cleaning method) of the current disclosure may include various features (and operations), which may contribute, both individually and collectively, to successful sugarcane cleaning. In certain embodiments, a vertical-axis fan assembly may be provided, with fan blades and a hub. The fan blades may include a twisted geometry along the blade profile from hub to blade tip. For example, the fan blades may be configured with an airfoil design, with a more aggressive orientation (i.e., closer to vertical) close to the hub, a less aggressive orientation (i.e., closer to horizontal) close to the blade tips, and a smoothly transitioning profile between the two. Among other benefits, this may provide for more evenly distributed airflow within the extractor, and generally reduced power consumption for a particular cleaning operation. In certain embodiments, relatively small clearances may be provided between the blade tips and a fan housing (or other interior surface of the extractor), which may also contribute to more efficient and successful cleaning operations.

Further with regard to the fan assembly, a fan hub may be configured with a relatively wide hub diameter, and a hub cover may extend from a lower (i.e., intake) plane of the fan blades into the stream of plant (and other) material entering the extractor. In certain embodiments, such a hub cover may be generally conical (e.g., a rounded cone with the tip extending into the incoming stream of material), although other configurations are also possible. The wider hub and the extension of the hub cover into the inlet stream may, individually and collectively, tend to support a more uniform velocity field within the extractor, while also physically distributing the plant matter more evenly around the cleaning chamber. These effects, individually and collectively, may further contribute to efficient and successful cleaning.

Various features on the housing (and other bodies) of the extractor may also be included, in order to provide a smoother and more uniform air flow (or otherwise condition flow through the extractor). In certain embodiments, for example, an extended cylindrical wall, a venturi duct, or both may be provided in order to streamline and vertically (or otherwise) orient air flow through the extractor. In certain embodiments, various vanes may be provided even with, above, or below the fan blades in order to provide similar effects. In certain embodiments, various mounting configurations (e.g., the mounting attachment for the extractor hood) may be modified in order to reduce or remove shoulders or other flow impediments from the interior of the extractor.

In some embodiments, various features may be arranged to serve as deflectors, in order to direct streams of cane billets and other materials by physical impact with portions of the streams. For example, a deflector body may be configured to extend into a cleaning chamber where a feed stream of cane billets and other material enters the cleaning chamber. A deflection surface of the deflector body may be configured to deflect a portion of the cane billets and other material within the cleaning chamber, thereby affecting the interaction of cane billets and other materials with the air flow of the generated flow field.

In some embodiments, a deflector body may be configured to direct deflected cane billets and other material along a deflected path that intercepts a hub cover of the fan. In this way, for example, the deflector body may direct a substantial portion of the cane billets and other material toward a physical impact with the hub cover, such that the hub cover physically separates the cane billets and other material, at least in part.

In some embodiments, guide vanes may be disposed around a perimeter of the cleaning chamber to at least partly guide the air flow generated by the fan. The guide vanes may be configured such that, as the cane billets and other material are moved toward an outlet of the cleaning chamber by the air flow, the guide vanes physically deflect a portion of the cane billets and other material away from the outlet.

As a result of these and other features, the disclosed extractor (and related method) may tend to produce cleaner outlet flows and lower-loss ejected trash streams than traditional extractor configurations, with reduced overall power consumption. It will be understood, accordingly, that the disclosed extractor (and related method) may facilitate improved cleaning of material streams and more cost-effective sugarcane harvesting.

As will become apparent from the discussion herein, the disclosed extractor and cleaning and method may be used advantageously in a variety of settings and with a variety of machinery. In certain embodiments, referring now to FIG. 1, the disclosed extractor and cleaning method may be implemented with regard to a sugarcane harvester 20. It will be understood, however, that the disclosed system and method may be used for various other vehicles or non-vehicle platforms, including various sugarcane harvesters of different configurations or designs than the sugarcane harvester 20 of FIG. 1.

The harvester 20 is presented in a side perspective view in FIG. 1, with the front of the harvester 20 facing to the left. Accordingly, certain right-side components of the harvester 20 may not be visible in FIG. 1. The harvester 20 may include a main frame 22 supported on track assemblies 24 or wheels (not shown), with a cab 18 to house an operator. An engine 26 may supply power for driving the harvester along a field and for powering various driven components of the harvester 20. In certain embodiments, the engine 26 may directly power a hydraulic pump (not shown) and various driven components of the harvester 20 may be powered by hydraulic motors (not shown) receiving hydraulic power from the hydraulic pump via an embedded hydraulic system (not shown).

A cane topper 30 may extend forward of the frame 22 in order to remove the leafy tops of sugarcane plants (not shown), and a set of crop dividers 32 (only the left-side divider 32 shown in FIG. 1) may then guide the remainder of the sugarcane toward internal mechanisms of the harvester 20 for processing. As the harvester 20 moves across a field, plants passing between the crop dividers 32 may be deflected downward by an upper knockdown roller 36 and a lower knockdown roller 38 before being cut near the base of the plants by a base cutter assembly 34 mounted on the main frame 22. Rotating disks, guides, or paddles (not shown) on the base cutter assembly 34 may further direct the cut ends of the plants upwardly and rearward within the harvester 20 toward a feed train including successive pairs of upper and lower feed rollers 38 and 40. The feed rollers 38 and 40 may be rotatably supported by a chassis 28 (e.g., a welded extension of the frame 22), and may be rotatably driven by a hydraulic motor or other device (not shown) in order to convey the stalks toward chopper drums 44 and 46 for chopping into relatively uniform billets.

The chopper drums 44 and 46 may rotate in opposite directions in order to chop the passing stalks into billets and propel the billets into a cleaning chamber 48 at the base of a primary extractor 50. The primary extractor 50 may utilize a powered fan (or similar device) to extract trash and debris from a cleaning chamber 48, while allowing the cane billets to drop onto a loading elevator 52 with a forward end located at the bottom of the cleaning chamber 48. The loading elevator 52 may then convey the cleaned billets upward to a discharge location 54, below a secondary extractor 56, where the billets may be discharged into a trailing wagon or other receptacle (not shown).

In certain embodiments, one or more control devices, such as controller 58, may be included in (or otherwise associated with) the harvester 20. The controller 58, for example, may include one or more computing devices including various processor devices and various associated memory architectures. In certain embodiments, the controller 58 may additionally (or alternatively) include various other control devices such as various electro-hydraulic valves and hydraulic circuits, various electronic control circuits and devices (e.g., various power electronics devices), and so on. In certain embodiments, the controller 58 (or another control device) may be in communication with various switches, controls and other interfaces or input devices (not shown) in the cab 18, as well as with various sensors, actuators, or other devices (not shown in FIG. 1) distributed throughout the harvester 20. In certain embodiments, the controller 58 (or another control device) may be a remotely located control device that communicates with various devices and systems of the harvester 20 via wireless or other extended-distance communication means.

Figure 2:
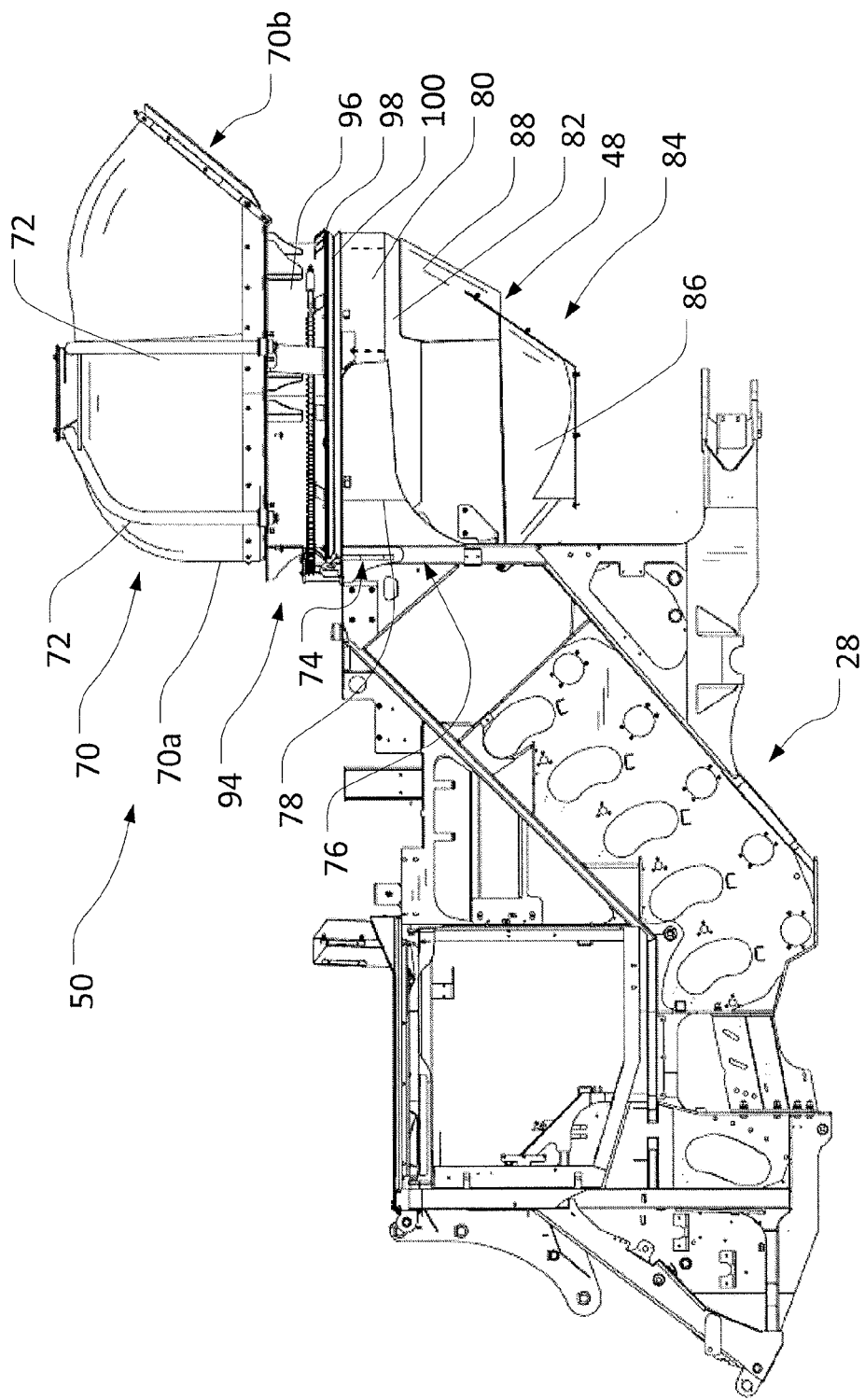
FIG. 2 is an elevational view of certain components of the sugarcane harvester of FIG. 1, including the trash extractor.

Referring also to FIG. 2, various components of the extractor 50 are depicted. Generally, a base 74 of the extractor 50 may be supported by the chassis 28, such that the stream of plant (and other) material from the chopper drums 44 and 46 (see FIG. 1) may flow through an inlet opening 76 and into the cleaning chamber 48. The base 74 may include a base ring 80 and side members 78 extending along either side of the ring 80, as well as a base cone 82 extending generally downward from the base ring 80 and around the cleaning chamber 48. Below the cleaning chamber 48, a cane basket 86 and an outlet opening 84 may be provided, in order to guide billets falling from the cleaning chamber 48 onto the elevator 52 (see FIG. 1). The perimeters of the cane basket 86 and the base cone 82, respectively, may exhibit generally slanted profiles in order to allow the elevator 52 to extend upward at an appropriate angle (see FIG. 1) and to rotate from side to side depending on the location of the trailing wagon (or other receptacle).

Figure 3:
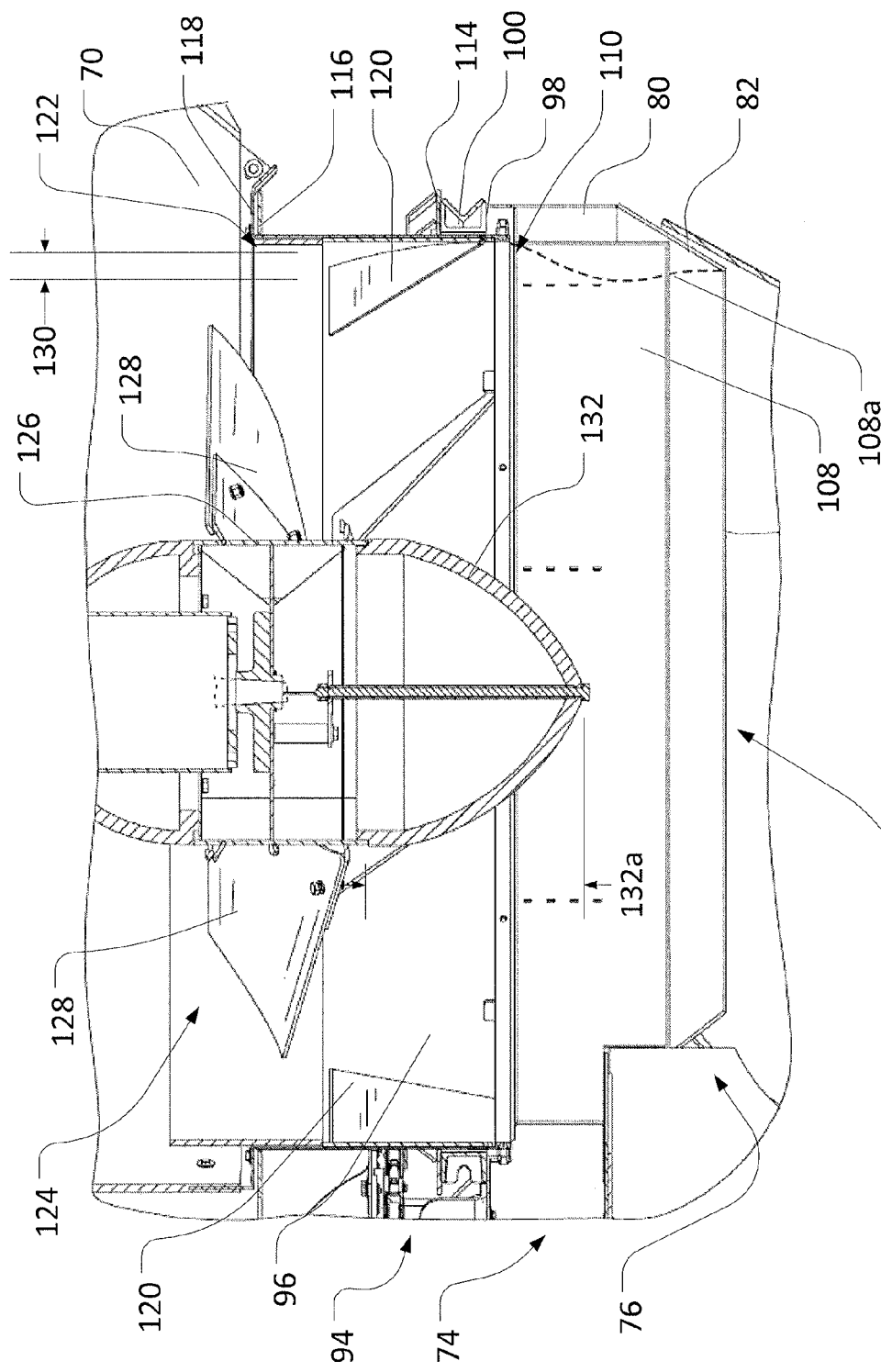
FIG. 3 is a partial cross-sectional view of certain components of the trash extractor of FIG. 1.

A fan housing 94 with a primary ring 96 may be seated above the base ring 80 and may generally surround portions of a fan assembly 124 (see, e.g., FIG. 3). The primary ring 96 may include various vanes 120 (see, e.g., FIG. 3) and may generally support the hood 70. The hood 70 may include various tubular supports 72, as well as a closed end 70a and an ejection end 70b, from which debris may be ejected from the extractor 50. The primary ring 96 and the hood 70 may be configured to collectively rotate with respect to the extractor base 74, in order to appropriate orient the stream of trash from the ejection end 70b of the hood 70. For example, a chain drive (not shown) may be provided to rotate the primary ring 96 and thereby to rotate the hood 70. Other mechanisms and configurations for the rotation of the hood 70 may alternatively (or additionally) be utilized. The base ring 80 may also support a cable seat 100, by way of a support ring 98, in order to hold a cable (not shown) to support the elevator 52.

Referring also to FIG. 3, various internal features of the extractor 50 are depicted. For example, an inner ring 108 may be provided within the extractor 50, which ring 108 may extend generally downward from the primary ring 96 within the base cone 82, in order to define an extended cylindrical wall within the cleaning chamber 48. As discussed in greater detail below, this inner ring 108 may assist in streamlining air flow within the cleaning chamber 48, while also providing for a more evenly distributed and more generally vertical velocity field.

In certain embodiments, the inner ring 108 (or a similar feature) may be further contoured or configured in order to provide a venturi duct within the cleaning chamber 48. For example, a contoured inner ring 108a may alternatively (or additionally) be provided, which may define an axial flow profile that is wider at the top and the bottom (as depicted) than in the middle. In this way, air flow through the ring 108a may be accelerated through the reduced-area middle portion, thereby creating more strongly streamlined, more uniform, and more vertical flow for the separation of trash from sugarcane billets. It will be understood that various other configurations may also be possible, in order to provide such a venturi profile within the cleaning chamber 48.

Figure 4:
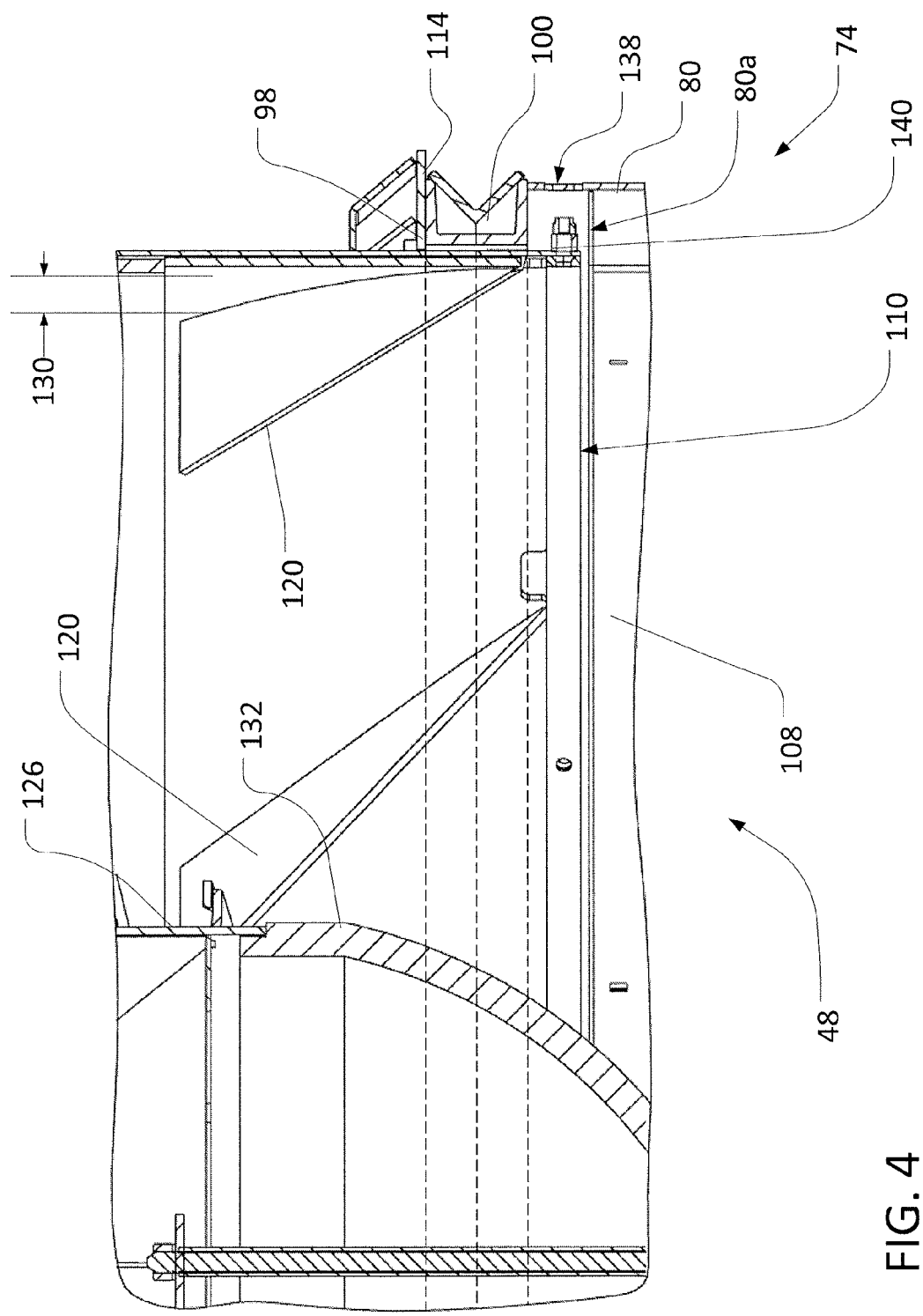
FIG. 4 is an enlarged partial cross-sectional view from a perspective similar to FIG. 3.

In certain embodiments, a relatively smooth junction 110 between the inner ring 108 and the primary ring 96 may be provided, in order to provide a substantially straight (e.g., generally step-less) flow path for air flow through the extractor 50. Referring also to FIG. 4, for example, were the inner walls (and, accordingly, the flow area) of the cleaning chamber 48 just below the primary ring 96 to be defined by the base ring 80, a shoulder (or step) 80*a* would extend into the upward air flow between the base ring 80 and the primary ring 96. This could cause a less streamlined and more turbulent air flow, as well as the physical impediment to upwardly moving material provided by the shoulder 80*a* itself. In the embodiment depicted, however, the inner ring 108 and the primary ring 96 may exhibit generally the same radial dimensions at the junction 110 between the rings 108 and 96. Accordingly, there may be relatively little impedance of air flow at the junction 110 and, correspondingly, a more streamlined, more vertical, and less turbulent flow field.

The primary ring 96 and related components may be mounted to the base 74 in various ways. For example, the support ring 98 may be supported by the base ring 80 and may in turn support a flange 114 of the primary ring 96. In certain embodiments, the flange 114 may be slidably seated above the support ring 98, such that the primary ring 96 (and the hood 70) may rotate as needed with respect to the support ring 98 and the extractor base 74. The primary ring may further extend through the interior of the support ring 98 and may include an attachment device 140 (e.g., a mount for a bolt and a tubing connection) for securing the support ring 98 to the base. In certain embodiments, various access holes 138 may be provided in the base ring 80 in order to access the attachment device 140 (and thereby to secure or detach the primary ring 98) from outside of the base ring 80.

A relatively smooth junction 122 similar to the junction 110 may also be provided between the primary ring 96 and the hood 70, in order to further streamline air flow through the extractor 50. Referring again to FIG. 3, for example, a flange 116 may be provided on the primary ring 96. The flange 116 may slidably support a mounting ring 118, on which the hood 70 may be seated. As depicted in FIG. 3, the mounting ring 118 may be supported by the flange 116, but may not extend inward along the flange 116 past the inner wall of the primary ring 96. Accordingly, at the junction 122 between the mounting ring 118 and the flange 116 of the primary ring 96, there may not be a inwardly extending step or shoulder to impede the air (and material) flow through the extractor 50, and the air (and material) may be able to more smoothly expand outward across the junction 122 and into the hood 70 for ejection.

Various other features may also be included. Still referring to FIG. 3, multiple instances of the guide vanes 120 may be provided in order to guide airflow through the extractor 50 and, in some configurations, to deflect cane billets and other material being carried by the air flow. In the embodiment depicted, the vanes 120 may be formed as part of (or mounted to) the primary ring 96, may be generally disposed below fan blades 128, and may be uniformly angled counter to the rotation of the fan assembly 124. As with various other features, such a configuration may tend to provide more uniform, streamlined, and vertical air flow, which may lead to more effective and efficient trash extraction. Further, with the guide vanes 120 angled counter to the rotation of the fan assembly, as discussed in greater detail below, the guide vanes 120 may physically impact cane billets and other material as the cane billets and other material move upward toward the hood along the perimeter of the cleaning chamber 48. In this way, for example, the guide vane 120 may deflect back into the cleaning chamber 48 cane billets that might otherwise slip past the tips of fan blades 128 into the hood 70.

Other configurations of the vanes 120 (and other vanes) may also be possible. In certain embodiments, various other vanes (not shown) may alternatively (or additionally) be included at other locations, or on other features, of the extractor 50. For example, in addition (or as an alternative) to the vanes 120 depicted, a set of vanes may be provided above the fan blades 128 (e.g., within the hood 70 or on an upward extension of the primary ring 96). In certain embodiments, the vanes 120 (or other vanes) may be angled with the rotation of the fan assembly 124, may vary in orientation from vane to vane (i.e., may not be uniformly angled), or may otherwise vary from the example configuration depicted in FIG. 3.

In certain embodiments, various louvers (not shown) may also be provided, which may further guide and direct air flow into (and within) the cleaning chamber 48. Various orientations of the louvers may be possible, including vertical, horizontal, and various angled orientations. In certain embodiments, the various louvers may be oriented uniformly (e.g., with uniform angles with respect to vertical). In certain embodiments, louvers of various different orientations may be utilized together.

Figure 5:
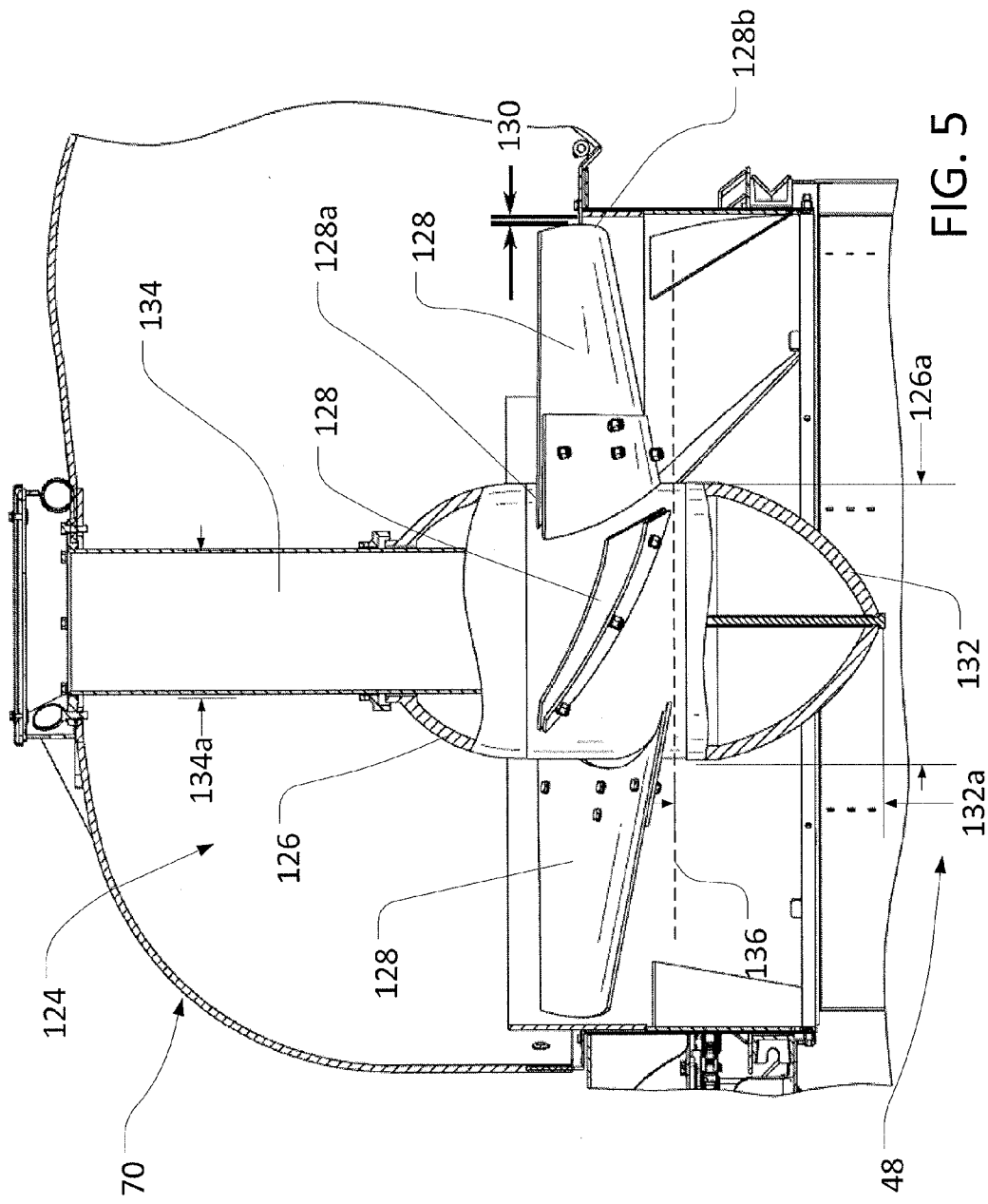
FIG. 5 is an elevational view of an example fan assembly of the trash extractor of FIG. 1, with cross-sectional views of certain components of the trash extractor.

Still referring to FIG. 3 and also referring to FIG. 5, the fan assembly 124 may include a hub 126 supporting various fan blades 128. In certain embodiments, the fan blades 128 may include a twisted geometry along the blade profile from the blade portion 128*a* near the hub 126 to blade tip 128*b*. For example, the fan blades 128 may be angled more aggressively (i.e., closer to vertical) at the portion 128*a* close to the hub and less aggressively (i.e., closer to horizontal) at the blade tips 128*b*, with a smoothly transitioning profile between the two. In certain embodiments, the blades 128 may include an airfoil profile, in which the blades 128 exhibit a curved profile at each radial distance from the hub 126, with the portion 128*a* near the hub 126 exhibiting a generally more aggressive (e.g., more curved) profile and with the blade tips 128*b* exhibiting a generally less aggressive (e.g., less curved) profile. In certain embodiments, a relatively narrow clearance 130 between the fan blades 128 and the fan housing (e.g., the primary ring 96) may be provided. Among other benefits, these various designs may provide for more even airflow and reduced power consumption during operation of the fan assembly 124, as well as fewer losses of cane billets past the fan blades 128 and into the hood 70. (Of note, the blades 128 in FIG. 3 are oriented out of the cross-sectional plane of FIG. 3, and therefore do not appear to extend fully to the edge of the indicated clearance 130. It will be understood that a similar clearance (not labeled) between the blades 128 and the housing may obtain at each point (or a subset of points) along the path of the fan blades 128 within the housing.)

In certain embodiments, a relatively wide hub 126 (and related components) may be provided. For example, the hub 126 may include a relatively wide body diameter 126*a* (e.g., approximately 20 inches), and a spindle 134 with a relatively wide diameter 134*s* (e.g., approximately 10 inches). These relatively wide diameters 126*a* and 134*a* may, individually or collectively, contribute to more uniform air and material flow, and generally improved extractor performance. It will be understood that other diameters 126*a* and 134*a* may be possible, including diameters 126*a* and 134*a* that are larger or smaller than the example dimensions noted above.

In certain embodiments, a hub cover 132 of various configurations may be included. In certain embodiments, the hub cover 132 may include a rounded conical profile (as depicted in the various figures), although other configurations are also possible. In certain embodiments, the hub cover 132 may extend a relatively large distance downward from a lower (or, generally, an "intake") plane 136 of the path of the fan blades 128 into the cleaning chamber 48. For example, in the embodiment depicted, the hub cover 132 may extend one-third of its length 132a or more past the lower edge of the primary ring 96 (i.e., junction 110) and into the inner ring 108. (AS noted above, various geometries for blades 128 may be possible. As such, the extended profile of the blades 128 may not necessarily trace a true geometrical plane at the lower (or intake) end. In this light, it will be understood that an intake "plane" of a set of fan blades 128 may include a true geometrical plane aligned with a lower (or other) point along the fan blades 128, or another surface defined by the lower (or other) contour of the rotating blades 128.)

Figure 6A:
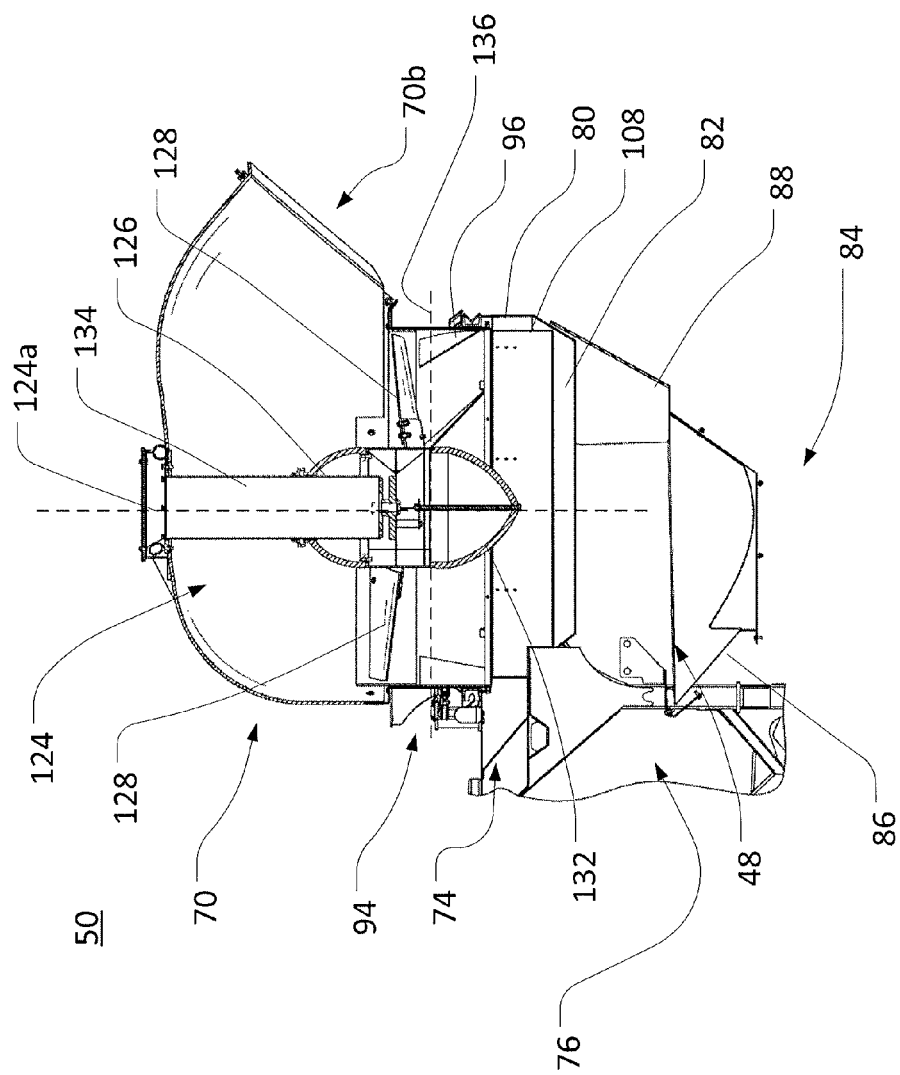
FIG. 6A is a cross-sectional view of the trash extractor of FIG. 1.
Figure 6B:
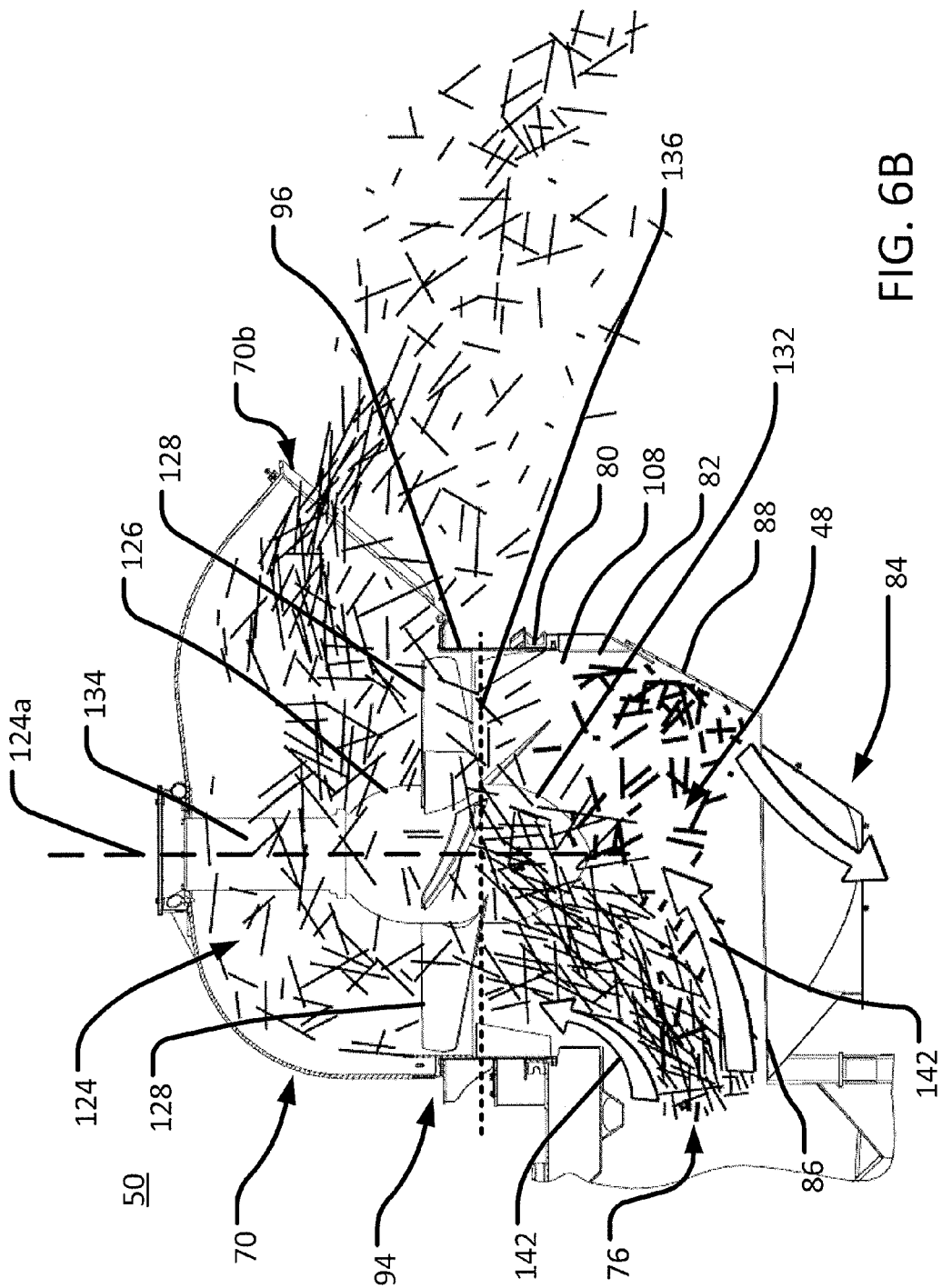
FIG. 6B is an elevational view of the interior of the trash extractor of FIG. 1, with a billet stream being processed by the trash extractor.

Referring also to FIGS. 6A and 6B, certain effects of the above-noted features and designs on the flow of cane billets and trash through the extractor 50 are depicted. As also described above, the fan assembly 124 may rotate around a vertical axis (e.g., axis 124a) in order to create a pressure gradient and velocity field within the cleaning chamber 48 and the hood 70. Referring in particular to FIG. 6B, this may draw billets (thinner lines) and trash (thicker, darker lines) from the inlet opening 76 into the cleaning chamber 48 for separation of the billets from the trash. The heavier (or more dense) billets may tend not to be drawn into the hood and, due to the momentum of the billet flow, may travel across the cleaning chamber 48 to impact a containment sheet 88 and then fall into the cane basket 86 and out of the outlet opening 84. In contrast, the lighter (or less dense) trash may tend to be drawn past the fan blades 128, into the hood 70, then ejected from the ejection end 70b of the hood 70.

As noted above, various of the features of the disclosed trash extractor 50 (e.g., the hub cover 132, the airfoil fan blades 128, the wider hub 126 and spindle 134, the inner ring 108, the small blade clearance 130, and so on) may tend to create a more uniform and more generally vertical velocity field for the air and material moving through the extractor 50. As can be seen in FIG. 6B, this may generally result in a relatively even distribution of material at various locations within the cleaning chamber 48. For example, referring to the annular flow region surrounding the hub 132 below the lower plane 136 of the path of the fan blades 128, it can be seen that the trash material may be relatively evenly distributed across most of the chamber 90. This may generally result in better lift of the trash into the hood 70 by the fan assembly 124, while also generally less carriage of cane billets into the hood 70 by clumped masses of trash. For example, an even distribution of material within the chamber 90 may tend to expose a greater surface area of the material to the air flow, resulting in better lift of lighter material (i.e., into the hood 70) by the air flow. Further, an even distribution of material within the chamber 90 may tend to reduce the clumping of trash and billets together. Accordingly, fewer billets may be carried upward (i.e., into the hood 70) as part of larger clumps of trash.

In part, the more even distribution of material within the cleaning chamber 48 may result from the relatively wide hub diameter 134a and the extension of the hub cover 132 into the inlet stream of plant (and other) material. For example, the extension of the hub cover 132 into the cleaning chamber 48 may tend to create a high pressure atmosphere in the chamber, while also tending to reduce air voids and recirculation in the chamber by physically redirecting the air flow and cane flow. In configurations in which the hub cover 132 extends directly into an inlet flow path of the trash and cane billets, the hub cover 132 may also physically interact with (i.e., physically impact) the incoming material to further distributing the material about the chamber 90 and thereby further increasing the cleanness of the outlet stream and reducing cleaning loss. For example, in FIG. 6B it can be seen that the hub cover 132 may be configured to extend generally into the center of an inlet flow path defined by the boundary flow paths 142. Similarly, the inlet opening 76 of the cleaning chamber 48 may be configured to generally direct an inlet stream into the cleaning chamber 48 along a path that directly intersects with the hub cover 132. Accordingly, not only may the hub cover 132 affect the velocity field of the air flow through the chamber 90, but the extension of the hub cover 132 into the inlet stream may also cause cane billets and trash in the inlet stream to physically impinge (i.e., impact) upon the hub cover 132. This physical contact may tend to distribute the trash material and cane billets relatively uniformly about the cleaning chamber around the hub cover 132, while also robbing the heavier cane billets of momentum so that the billets tend to fall from the hub cover 132 into the containment sheet 88 (or other features of the extractor 50) and out of the outlet opening 84.

Figure 7B:
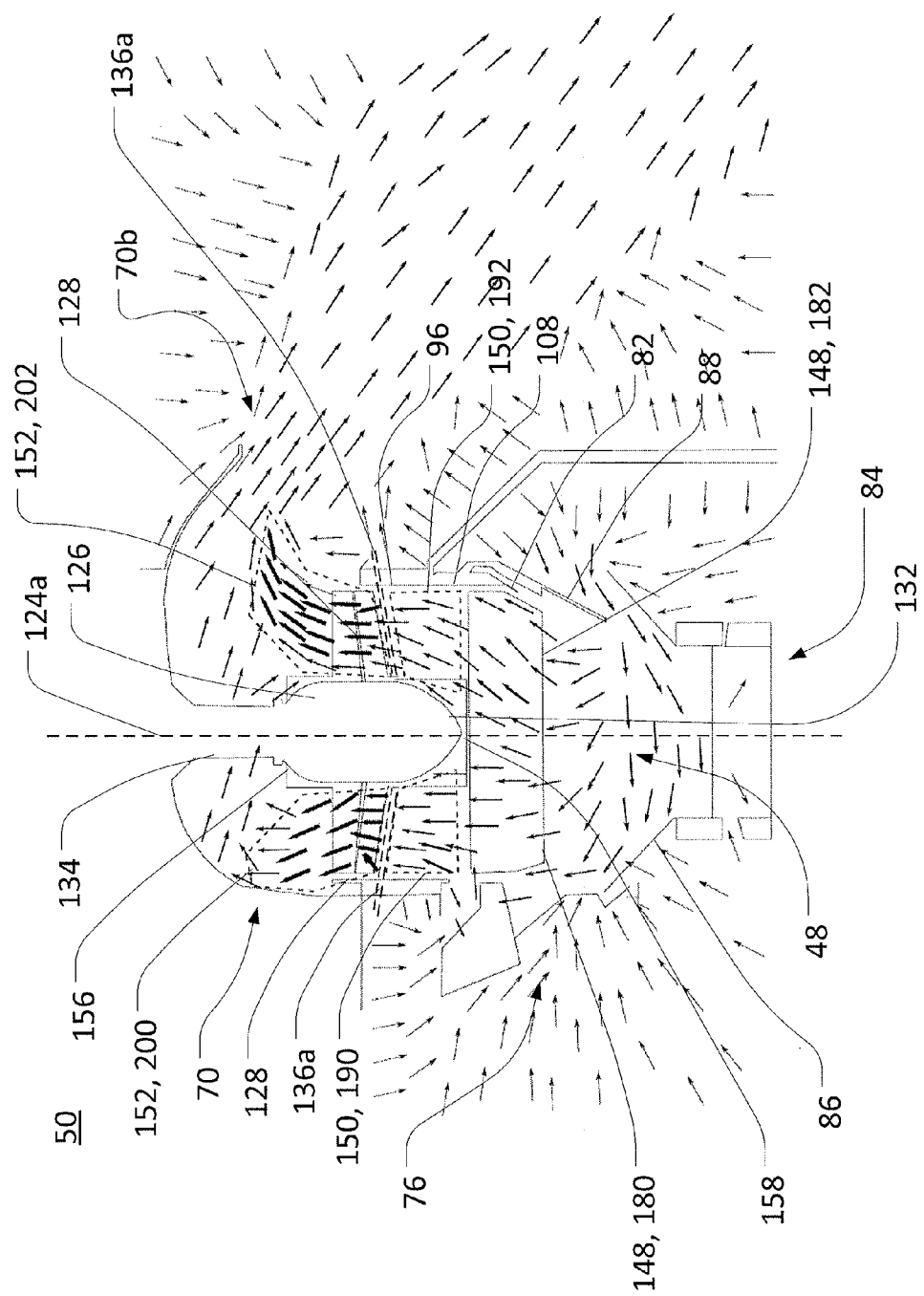

Referring also to FIGS. 7A and 7B, an example velocity field for an air flow through the extractor 50 is depicted. It will be understood, however, that other beneficial flow fields may be alternatively obtained. In FIG. 7A, faster velocities are depicted as darker lines and in FIG. 7B, faster velocities are depicted as thicker lines. (For clarity of presentation, multiple velocity vectors have been condensed into single average velocity representations in FIG. 7B.) As in FIG. 6, it can be seen that the various disclosed features of the extractor 50 collectively contribute to regions of relatively uniform and generally vertical velocity throughout the extractor 50. As noted above, this (and other factors) may contribute to more effective and efficient cleaning operations. In flow region 148, near the inlet opening 76, for example, it can be seen not only that the velocity field is relatively constant across the cleaning chamber 48, but that the velocity vectors are generally vertically oriented. Accordingly, billet and trash material entering the cleaning chamber 48 may be exposed to relatively uniform and vertical flow almost immediately.

In certain embodiments, although the scalar velocities of the air flow across the chamber 90 may be relatively constant, the velocity field within various flow regions of the chamber 90 may not be entirely uniform. For example, within the flow region 148, below the hub cover 132, scalar velocities in the rearward portion of the flow region 148 (i.e., to the right of the axis 124a in FIGS. 7A and 7B) may be somewhat larger than scalar velocities in the forward portion of the flow region 148 (i.e., to the left of the axis 124a in FIGS. 7A and 7B). This partial (and, potentially, slight) non-uniformity may further contribute to a relatively even distribution of material within the flow region 148 and to more effective and efficient cleaning operations. For example, because material may only enter the cleaning chamber 48 from the forward side (i.e., from the left from the perspective of FIGS. 7A and 7B), the higher velocities on the rearward side of the chamber 90 (i.e., to the right from the perspective of FIGS. 7A and 7B) may tend to draw material into the rearward portion of the chamber 90 (e.g., due to the reduced pressure associated with the higher velocities) and thereby more evenly distribute the material entering the chamber 90. As also noted above, more even distribution of material within the chamber 90 may tend to allow more effective and efficient cleaning operations. For example, because evenly distributed material may be relatively thinly spread in any given portion of a cross-section of the chamber 90, more surface area of the material may be exposed to the air flow through the chamber 90, billets may not be covered by (and carried with) clumps of lighter trash, and so on. Accordingly, better separation of billets and trash may be achieved, including with lower fan speeds and power than in certain traditional designs.

As the billets and trash continue upward within the cleaning chamber 48 into the generally annular flow region 150, the material may continue to be exposed to a generally vertical velocity field, as generated and guided by the velocity hub cover 132, the airfoil blades 128, the vanes 120 (not shown in FIGS. 7A and 7B), and so on. In certain embodiments, the hub cover 132 may be configured to extend downward into the cleaning chamber 48 such that some portion of the material may physically impact the hub cover 132. As noted above, this contact may tend to further distribute the billets and trash evenly across the cleaning chamber 48, while also robbing the heavier billets of the momentum that would be required for the billets to continue past the fan blades 128 and into the hood 70. Again, this may result in a more even distribution of plant (and other) material throughout the flow region 150, with a correspondingly more effective exposure of the trash to sufficient flow velocities for effective cleaning.

In certain embodiments, the velocity field across the flow region 150 may be generally uniform, such that billet or trash material at any given point across a horizontal portion of the flow region 150 may generally be exposed to the same air flow velocity. In contrast, various previous systems may tend to exhibit significantly higher air flow velocities in the rearward portion of the flow region 150 (i.e., to the right in FIGS. 7A and 7B) than in the forward portion of the region 150. In such designs, where the kinetic energy of the upward flow is skewed toward the rearward portion of the flow region 150, not only may the higher velocities in the rearward portion tend to carry billets past the fan blades (resulting in undesirable losses), but higher fan speeds and power may be generally required in order to generate sufficient velocities to draw material upward past the fan blades within the forward portion of the region 150. Fundamentally, this increase in fan speed and power may then correspond to an increase in the velocities in the rearward portion of the region 150, which may result in even more billet loss, as well as generally increased power consumption. Accordingly, it may be beneficial to provide a relatively uniform velocity field within the region 150, rather than a velocity field that is skewed (from a scalar perspective) toward the rearward portion of the region 150.

Indeed, in certain embodiments, it may be useful to provide a velocity field within the flow region 150 with somewhat larger scalar velocities in the forward portion of the flow region 150 than in the rearward portion of the region 150. As depicted in FIGS. 7A and 7B, for example, the average scalar velocity in the forward portion of region 150 may be generally higher than the average scalar velocity in the rearward portion, which may allow for more efficient movement of trash past the fan blades 128 across the entire cleaning chamber 48, while also preventing excessive loss of billets through the fan blades 128.

Moving still upward within the extractor 50, most of the material found in the generally annular flow region 152 may be trash, as most of the billets may have fallen out of the air flow toward the outlet opening 84. This may result from various factors. For example, the physical extension of the hub cover 132 into the material flow (and other disclosed features) may have assisted in evenly distributing the incoming material across the cleaning chamber, such that the lighter trash may have been effectively pulled across the fan blades 128 and the heavier billets may have been allowed to fall toward the outlet opening 84. Further, as noted above, the hub cover 132 may have physically contacted portions of both the billets and the trash, which may have further deflected the billets toward the outlet opening 84, while distributing the trash across the chamber 90 for uptake into the hood 70.

Due to the various design aspects noted above, the velocity field within the flow region 152 may be generally vertical and may be relatively uniformly distributed. Further, this relatively uniform and generally vertical flow field may extend upward into the hood 70, including up to and past the upper end 156 of the hub 126. In contrast, earlier designs may exhibit larger scalar velocities at the rearward portion of the flow region 152, and significant recirculation flows (i.e., significantly non-vertical flows) in close proximity to the upper edges of the fan blades. Accordingly, whereas trash (and billets) in earlier designs may tend to accumulate above the fan, the trash in the flow regions 152 may be carried strongly away from the fan blades 128, thereby clearing the flow regions 152 for more incoming material, preventing clogging of the blades, and generally contributing to effective and efficient cleaning. In this regard, the wider diameter 134a of the spindle 134 may also contribute to improved cleaning, as the wider spindle 134 (and sloped profile of an upper end 156 of the hub 126) may tend to prevent accumulation of trash material above the fan blades 128.

Various operations for cleaning a stream of sugarcane billets (e.g., with the extractor 50, including various of the operations described above, may be implemented as part of a sugarcane cleaning ("SC") method. Such a method may be implemented automatically (e.g., as controlled by the controller 58), manually (e.g., as controlled by an operator via various interfaces and input devices (not shown)), or as a combination of automatic and manual operations (e.g., as controlled manually by an operator via various input devices and automatically by the controller 58). It will be understood, accordingly, that an SC method may be implemented using various computing devices or by various hydraulic, electronic, mechanical, electro-hydraulic, electro-mechanical, or other control devices, in various combinations. In certain implementations, for example, an SC method may be implemented by way of the controller 58 controlling various rotational speeds of (or rate of power provided to) the fan assembly 124, the feed rollers 40 and 42, and the chopper drums 44 and 46.

Figure 8:
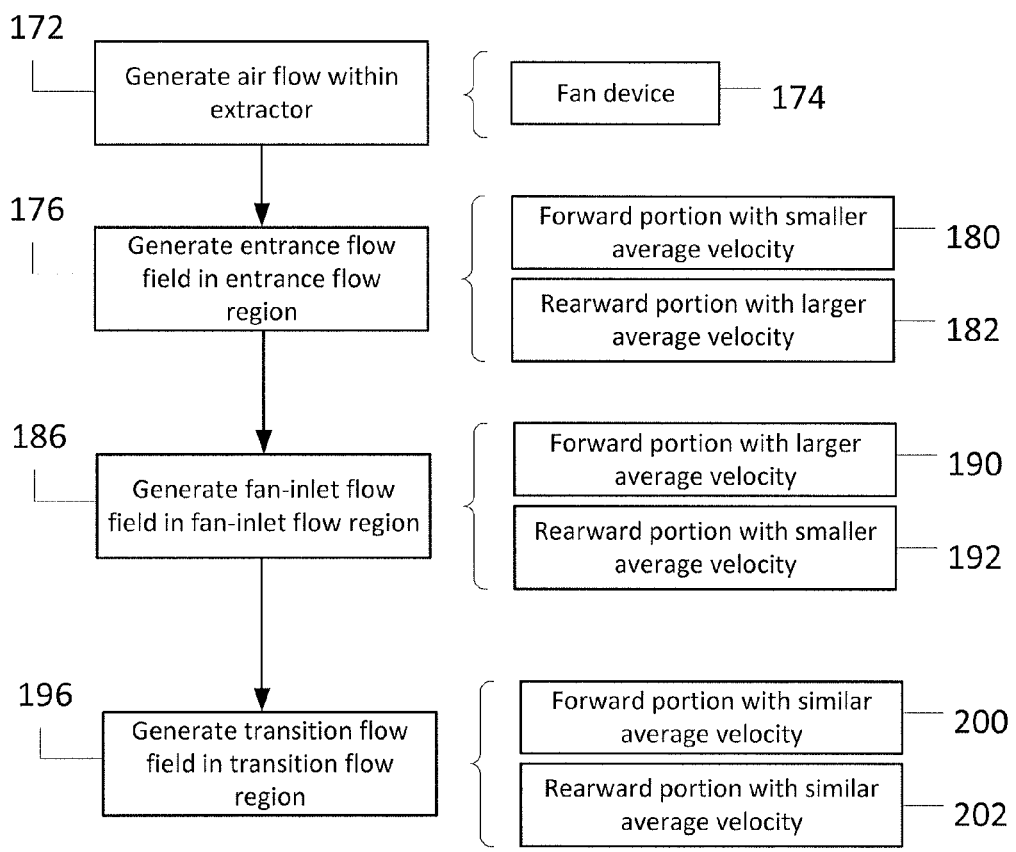
FIG. 8 is a diagrammatic view of a cleaning method, which may be implemented using the trash extractor of FIG. 1.

Referring also to FIG. 8, various operations of an example SC method 170 are represented. In certain implementations, the SC method 170 may include generating 172 an air flow within an extractor for a sugarcane harvester using a fan device 174, wherein air and plant material are carried by the generated 172 air flow from an inlet of the cleaning chamber upward toward an outlet from the extractor. The fan device 174 may include a device such as the fan assembly 124, or another device capable of generating an air flow (e.g., a turbine, pump, piston, or other device). For example, referring also to FIGS. 7A and 7B, the fan assembly 124 may be utilized to generate 172 an air flow within the extractor 50, whereby sugarcane billets and trash within a stream of material through the inlet opening 76 are carried upward within the cleaning chamber 48. The generated 172 air flow may further carry some of the material (e.g., the lighter trash) past the fan assembly 124 and out of the outlet opening 84. Air to feed the generated 172 air flow may be drawn from a variety of sources, including through the inlet opening 76, through various louvers (not shown) and other openings. A substantial portion of the generated 172 air flow may exit the extractor 50 through the outlet opening 84.

The SC method 170 may include generating 176, as part of the generated 172 air flow, an entrance flow field within an entrance flow region. The entrance flow region (e.g., the flow region 148, as depicted in FIGS. 7A and 7B) may be oriented within the cleaning chamber 48 of the extractor 50, generally between the fan device 174 (e.g., the fan assembly 124) and the inlet opening 76. In certain embodiments, the entrance flow region may extend vertically (or otherwise) between a lower end 158 of the hub cover 132 and the inlet opening 76.

In certain implementations, the generated 176 entrance flow field may exhibit a generally smaller average scalar flow velocity in a forward portion 180 of the entrance flow region than in a rearward portion 182 of the entrance flow region. For example, referring again to FIGS. 7A and 7B, the portion 180 of the flow region 148 to the left of the axis of rotation 124a may exhibit an average scalar velocity that is generally smaller than the average scalar velocity in the portion 182 of the flow region 148 to the right of the axis of rotation 124a.

The SC method 170 may include generating 186, as part of the generated 172 air flow, a fan-inlet flow field within a fan-inlet flow region. The fan-inlet flow region (e.g., the flow region 150, as depicted in FIGS. 7A and 7B) may be oriented within the cleaning chamber 48 of the extractor 60, generally between the inlet opening 76 and the fan device 174 (e.g., the fan assembly 124). In certain embodiments, the fan-inlet flow region (e.g., region 150) may extend vertically (or otherwise) between the entrance flow region (e.g., region 148) and the intake plane (e.g., intake plane 136a) of the fan device 174.

In certain implementations, with reference to FIG. 8, the generated 186 fan-inlet flow field may exhibit a larger average flow velocity in a forward portion 190 of the fan-inlet flow region than in a rearward portion 192 of the fan-inlet flow region. For example, referring again to FIGS. 7A and 7B, in the portion of the flow region 150 to the left of the axis of rotation 124a may exhibit an average scalar velocity that is generally larger than the average scalar velocity in the portion of the flow region 150 to the right of the axis of rotation 124a. In other implementations, flow velocities in the forward portion 190 and the rearward portion 192 of a fan-inlet flow region may compare in other ways (e.g., may be substantially similar).

The SC method 170 may include generating 196, as part of the generated 172 air flow, a transition flow field within a transition flow region. The transition flow region (e.g., the flow region 152, as depicted in FIGS. 7A and 7B) may extend from the cleaning chamber 48, across the fan blades 128, and into the hood 70 of the extractor 50. In certain implementations, the transition flow region (e.g., flow region 152) may extend from an intake plane of the fan device 174 (e.g., the intake plane 136a), or another reference area associated with the fan device 174, into the hood 70. In certain implementations, the transition flow region may extend substantially into the hood 70. For example, the flow region 152 can be seen to extend, within the hood 70, vertically past the upper end 156 of the hub 126.

In certain implementations, the generated 196 transition flow field may exhibit substantially similar average scalar flow velocities in both a forward portion 200 of the transition flow region and in a rearward portion 202 of the transition flow region. For example, referring again to FIGS. 7A and 7B, the portion 200 of the flow region 152 to the left of the axis of rotation 124a may exhibit an average scalar velocity that is generally similar to (e.g., within 5 to 10% of) the average scalar velocity of the portion 202 of the flow region 152 to the right of the axis of rotation 124a.

It will be understood that various other implementations may also be possible. In certain implementations, for example, one or more of the various flow regions (e.g., the flow regions 148, 150, and 152) may extend fully across the local width (e.g., local diameter) of the extractor 50 and, one or more of the fan-inlet and transition flow regions (e.g., the flow regions 150 and 152), may extend fully from the outer boundaries of the generated 172 air flow (e.g., at the inner boundaries of cleaning chamber 48 and the hood 70) to the hub 126 or hub cover 132 of the fan device. Other implementations may be possible, however, including with the transition flow region (e.g., the flow region 150) or the fan-inlet flow region (e.g., the flow region 152) extending from the outer boundaries of the generated 172 air flow to a projection of the outermost profile of the hub 126 (e.g., a vertical projection of the point of connection between the fan blades 128 and the hub 126) or other reference area.

Figure 9:
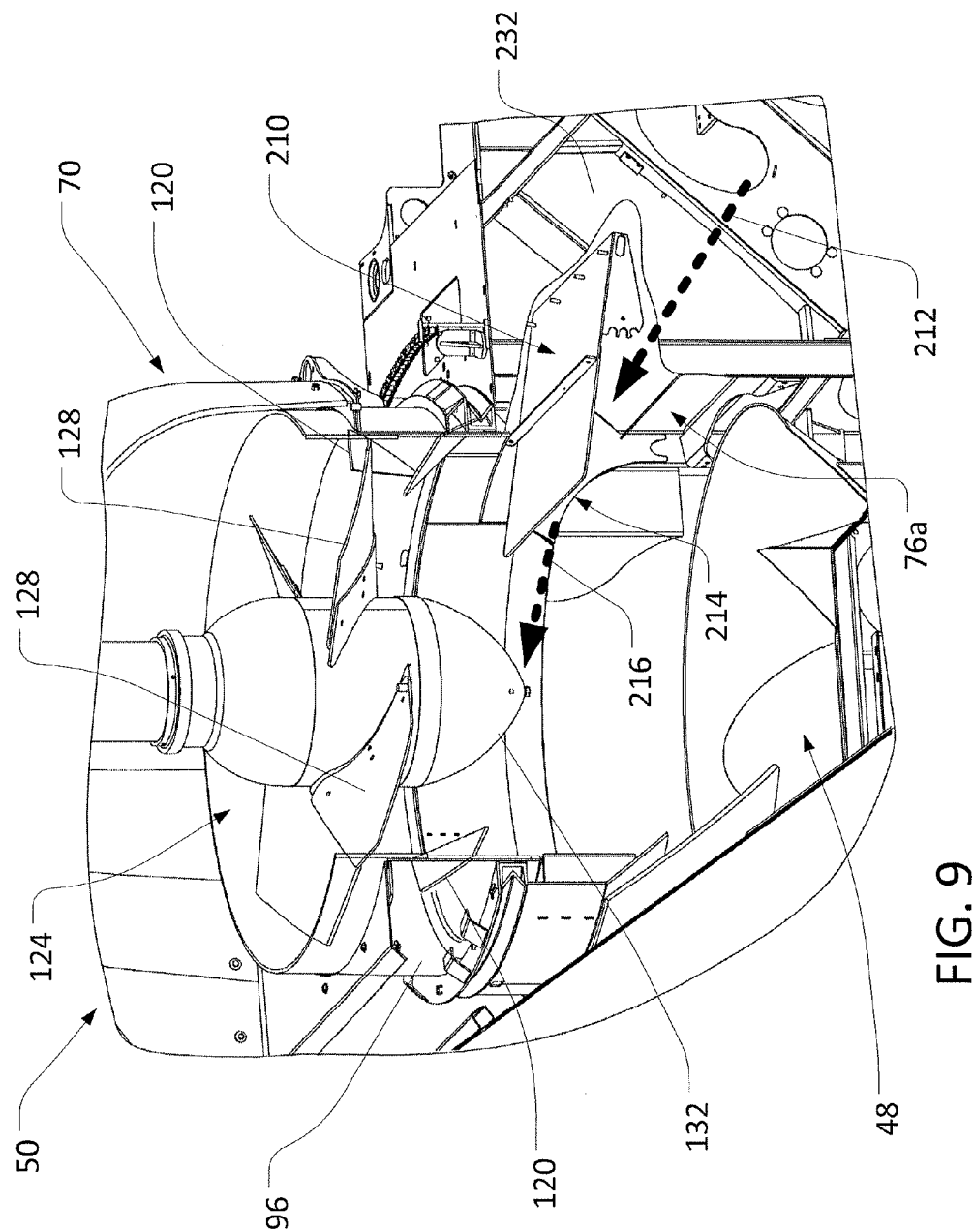
FIG. 9 is a perspective view of another configuration of the trash extractor of FIG. 1, taken from a side of the trash extractor, with certain components removed to show a deflector body of the trash extractor.
Figure 10:
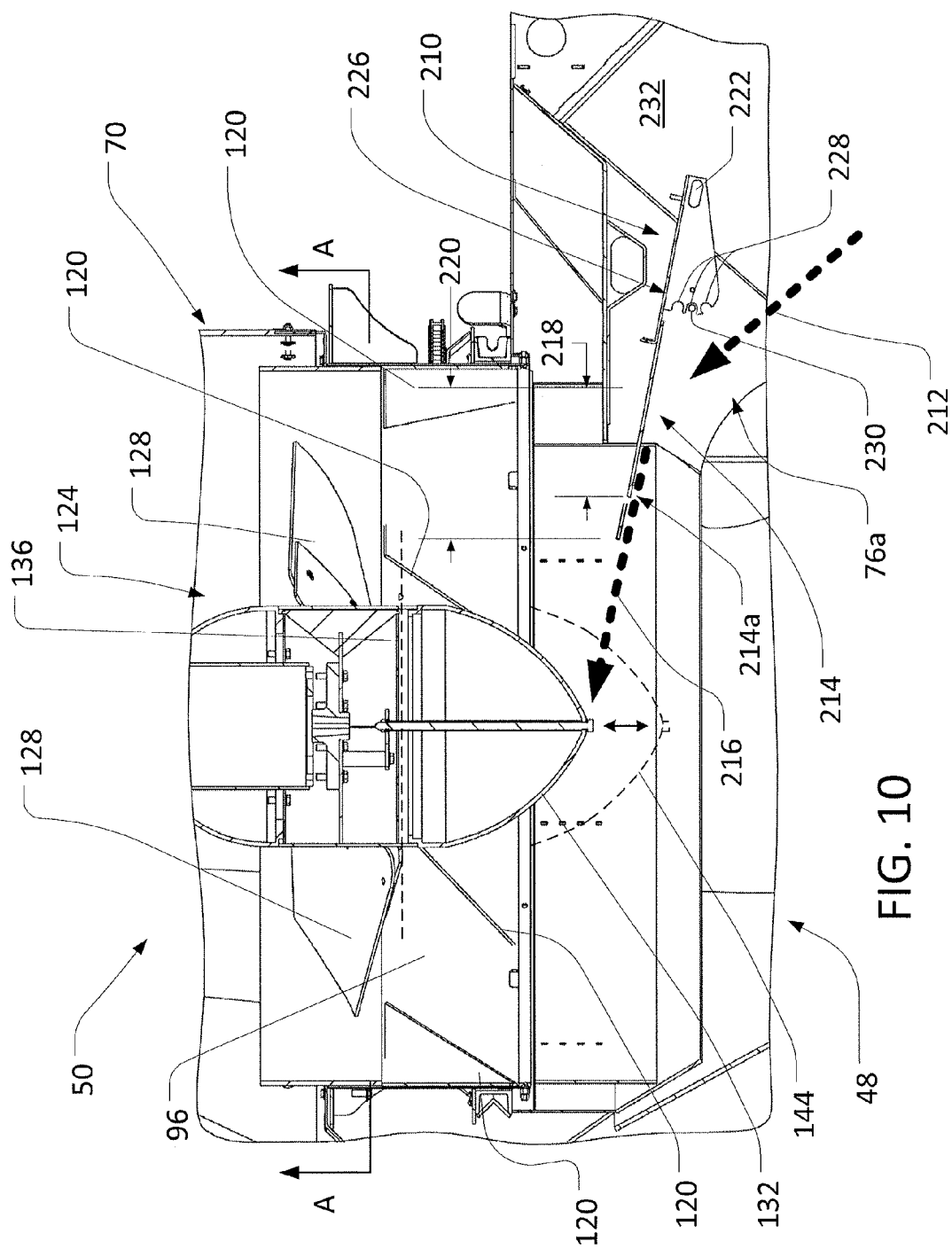
FIG. 10 is a cross-sectional view of the trash extractor configuration of FIG. 9, including the deflector body.

In various embodiments, it may be useful to provide a deflector body extending into the cleaning chamber of a trash extractor, such that the deflector body deflects cane billets and other material within the cleaning chamber. Referring also to FIGS. 9 and 10, for example, another configuration of the extractor 50 is depicted with an example deflector body 210 disposed at the inlet opening 76 of the cleaning chamber 48.

Generally, a deflector body may be configured to deflect cane billets and other materials within a cleaning chamber, such that the deflector body directs the deflected cane billets and other materials along a deflected path within the cleaning chamber. As depicted in FIGS. 9 and 10, the deflector body 210 is disposed generally above an inlet opening 76a into the cleaning chamber 48 (which opening 76a may be similarly configured to the inlet opening 76), such that at least part of a feed stream 212 of cane billets and other material that passes from the rollers 40 and 42 (see FIG. 1) into the cleaning chamber 48 may be deflected within the cleaning chamber 48, along a deflected path 216, by a lower deflection surface 214 of the deflector body 210 facing the feed stream 212. In this way, for example, the deflector body 210 may reduce (or eliminate) an upward component of the velocity of cane billets and other material within the feed stream 212 before the cane billets and other material fully enter the air flow within the cleaning chamber 48 (see, e.g., the air flow field depicted in FIGS. 7A and 7B). Among other benefits, this may prevent some cane billets and other material contained within the feed stream 212 from being carried out of the cleaning chamber 48 by the air flow before the cane billets have been appropriately separated from the other material.

In some embodiments, a deflector body may be configured to direct a portion of a feed stream towards a particular feature of an extractor. Where a hub cover is provided on an extractor fan, for example, a deflector body may be configured such that when the deflector body deflects a stream of cane billets and other material, at least a portion of the stream is directed along a deflected path that intersects the hub cover. In this way, the cane billets and other material traveling along the deflected path may physically impact the hub cover, with the impact acting generally to separate the cane billets and other material.

This impact-driven separation, in turn, may result in generally improved cleaning of the stream. For example, where cane billets and other material in a feed stream have massed together into clumps, air flow within a cleaning chamber may act collectively on the clumps as a whole, rather than separately on the cane billets and other material individually. As such, cane billets, as part of the clumps, may be carried out of the cleaning chamber with the other material. However, a physical impact with another object, such as a hub cover, may break up these clumps, such that the air flow may act separately on the cane billets and the other material. Further, physical impact with another object may generally re-distribute the cane billets and other materials from an incoming stream to a more diffuse arrangement within the cleaning chamber. Again, this may allow the air flow in the chamber to act relatively separately on the cane billets and other material, such that the heavier cane billets may fall downward for collection and the other material may be carried upward for disposal. Where the object impacted by the cane billets and other material is itself in motion (e.g., rotating within the cleaning chamber), this motion may further contribute to separation and redistribution of the cane billets and other materials.

As depicted in FIG. 10, the deflection surface 214 of the example deflector body 210 is configured so that a deflected stream of cane billets and other material moving along the deflected path 216 may, at least in part, physically impact the hub cover 132. As also discussed above, including with regard to FIG. 6B, such an impact may tend to separate clumps of cane billets and other material as well as generally redistribute the cane billets and other material around the cleaning chamber 48.

A deflection surface may be configured to direct deflected matter toward a hub cover (or other feature) in a variety of ways. As depicted in FIG. 10, for example, the deflection surface 214 is configured to have a generally planar geometry. Further, an inner end portion 214a of the deflection surface 214 extends at an angle (e.g., measured with respect to the axis of rotation of the fan assembly 124 or of the hub cover 132), such that a tangent line to the end portion 214a extends across the cleaning chamber 48 to intersect with the hub cover 132. In some embodiments, including where the deflection path 216 generally follows such a tangent line (e.g., as depicted in FIG. 10), such a configuration of the deflection surface 214 may generally ensure that at least a portion of the deflected stream of cane billets and other material impacts the hub cover 132 for separation and re-distribution within the cleaning chamber.

In some embodiments, the deflected path 216 may extend directly (e.g., without significant circumferential travel) between the deflection surface 214 and the hub cover 132 (or other feature). In other embodiments, a deflected path 216 may exhibit other profiles.

In some embodiments, adjustment of the deflector body 210 (and other components) may be possible. For example, the deflector body 210 or related features may be configured such that the deflection surface 214 may be adjusted between different extension distances within the cleaning chamber 48. As depicted, in FIG. 10, for example, the deflection surface 214 extends an extension distance 218, within the cleaning chamber 48, from the inlet opening 76a to a tip of the end portion 214a. In various embodiments, the deflector body 210 may be adjusted, such that the end portion 214a (or other feature) of the deflection surface 214 extends a larger extension distance 220 within the cleaning chamber. This may be useful, for example, in order to provide varying amounts or directions of deflection for cane billets and other material within the cleaning chamber 48, as may be useful to address different flow rates of material through the feed train into the cleaning chamber 48.

In some embodiments, a slotted arrangement may permit adjustments to the extension distance of a deflection surface within a cleaning chamber. For example, as depicted in FIG. 10, a slotted arrangement on a side mounting plate 224 of the deflector body 210 includes a mounting slot 222. By attaching the deflector body 210 to a frame 232 of the feed train of the harvester 20 (see also FIG. 9) at different locations along the mounting slot 222, the end portion 214a of the deflection surface 214 may be adjusted to different extension distances within the cleaning chamber 48.

In some embodiments, a telescoping arrangement (not shown) may be used, such that a portion of the deflection surface 214 may be moved with respect to a portion of the deflector body 210, in order to change the extension of the deflection surface 214 within the cleaning chamber 48. In some embodiments, an adjustment arrangement may be disposed on other features in addition (or as an alternative) to the deflector body 210. For example, a slot (not shown) similar to the mounting slot 222 may be provided on the frame 232 of the feed train, such that the extension distance of the deflection surface 214 within the cleaning chamber 48 may be changed by securing the deflector body 210 to the mounting feature at different positions on the slot.

In some embodiments, a deflector body may also (or alternatively) be adjustable to change other aspects of the orientation of an included deflection surface. For example, some deflector bodies (or related devices) may be adjustable to change a characteristic angle of the deflection surfaces of the deflector bodies. For example, a deflector body may be adjusted in various ways in order to change an angular orientation of the deflector body as a whole, an angle of a deflection surface where the surface deflects an incoming stream, an angle of the deflection surface at an end portion of the deflection surface, and so on.

As depicted in FIG. 10, the side mounting plate 224 for the deflector body 210 includes a fan-shaped end portion 226 with various mounting openings 228 configured to receive a mounting pin 230. Accordingly, the deflector body 210 and the deflection surface 214 may be adjustably disposed at different angles (e.g., relative to a rotational axis of the hub cover 132), depending on which of the openings 228 receives the mounting pin 230. In some embodiments, this may be useful, for example, to allow adjustment of the angle of the end portion 214a of the deflection surface 214, such that the deflected path 216 appropriately intersects with the hub cover 132 (or another feature or region of the cleaning chamber 48).

In some embodiments, a hub cover may also (or alternatively) be adjustable. Still referring to FIG. 10, for example, the hub cover 132 may be configured to be moved upward and downward within cleaning chamber 48, such that a lower end of the hub 132 exhibits different extensions within the cleaning chamber 48 (e.g., as measured from the lower fan blade plane 136). As depicted, for example, the hub cover 132 may be adjusted between a raised configuration (depicted in solid relief), at which the bottom end of the hub cover 132 just intercepts the deflection path 216, and a lowered configuration (depicted by dotted profile 144), at which the bottom end of the hub cover 132 extends below (or at least relatively farther into) the deflection path 216.

By changing the point (or points) of intersection of the deflection path 216 and the hub cover 132, adjustments to the hub cover 132 may also change the geometry to which the cane billets and other material are exposed when they impact the hub cover 132. As depicted in FIG. 10, for example, adjustment of the extension distance of the hub cover 132 may also cause the deflected path 216 to intersect the hub cover 132 at areas of different surface geometry for the hub cover 132. For example, where the deflected path 216 intersects the hub cover 132 near a lower end of the hub cover, the deflected path 216 may impact a different curved profile of the hub cover 132 than if the deflected path 216 intersects the hub cover 132 at a higher location. Similarly, materials impacting the hub cover 132 at a wider diameter of the hub cover 132 (e.g., higher up on the hub cover profile) may be exposed to higher local velocities of the hub cover surface(s), and, accordingly, greater potential deflection velocities. Similar effects may also be obtained through adjustment of the deflection body 210 (e.g., through adjustments of the angular orientation of the deflection surface 214). Accordingly, for example, adjustment of the hub cover 132 or the deflection body 210 may be useful in order to expose materials directed along the deflected path 216 to different deflection directions and magnitudes of impact at the hub cover 132.

As depicted in FIGS. 9 and 10, the deflection surface 214 is a generally planar surface extending from outside of the cleaning chamber 48 (i.e., to the right of the inlet opening 76*a* in FIG. 10) to inside of the cleaning chamber 48 (i.e., to the left of the inlet opening 76*a* in FIG. 10). This may, for example, permit relatively inexpensive manufacturing of the deflector body 210 using sheet metal or other similar materials. In other embodiments, the deflection surface 214 (or various other deflection surfaces) may extend different distances (including zero distance) outside of the cleaning chamber 48. Similarly, the deflection surface 214 (or various other deflection surfaces) may be configured with one or more non-planar surfaces.

Figure 11:
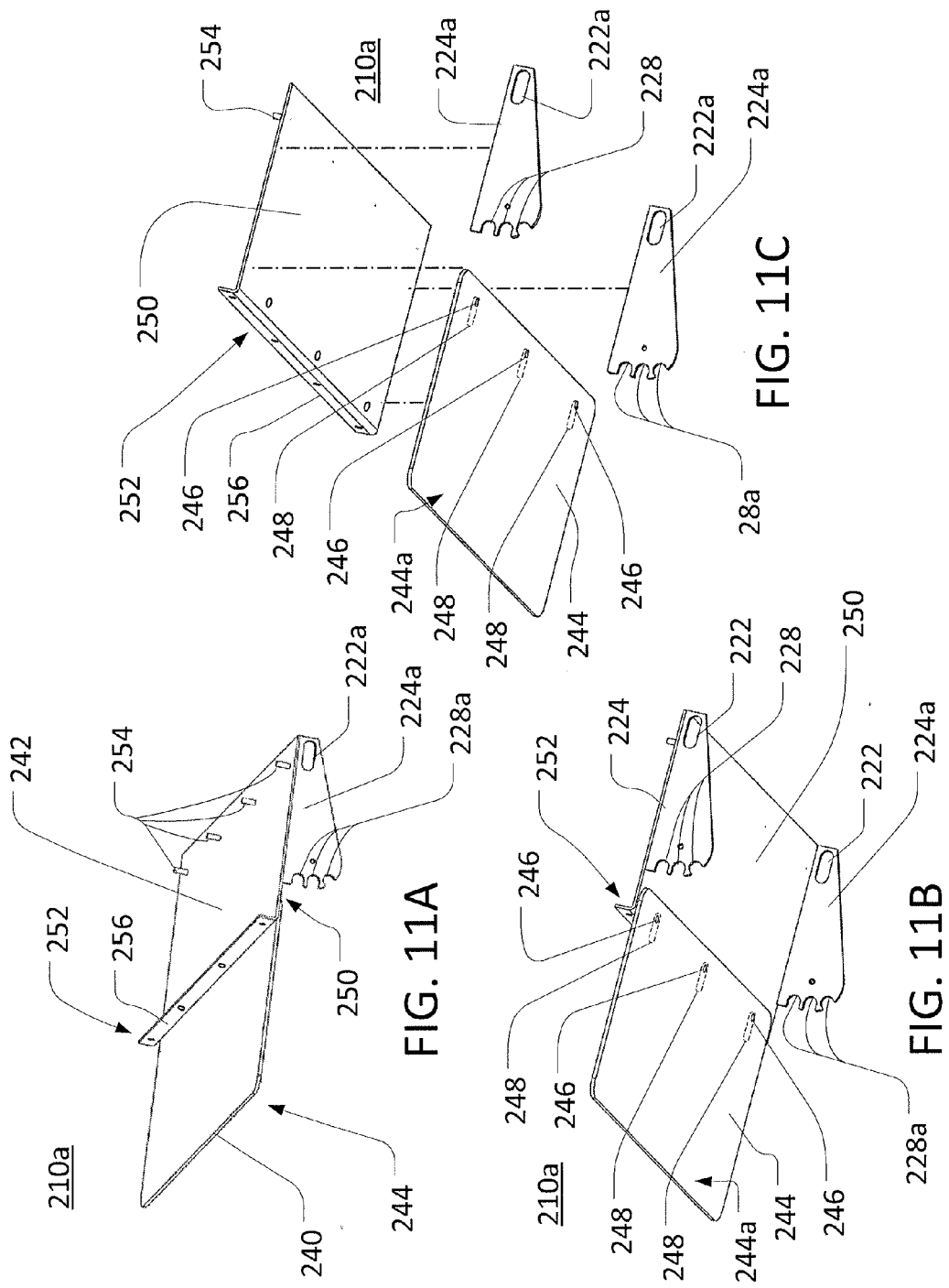
FIGS. 11A through 11C are upper and lower perspective views and an exploded view, respectively, of an example configuration of the deflector body of FIGS. 9 and 10.

Referring also to FIGS. 11A through 11C, an example configuration of the deflector body 210 is depicted as deflector body 210*a*. In some embodiments, configurations like that of the deflector body 210*a* may be useful to allow for adjustments to angular orientation of the deflector body 210*a* or extension of the deflector body 210*a* into a cleaning chamber (e.g., the cleaning chamber 48). In some embodiments, configurations like that of the deflector body 210*a* may allow relatively straightforward retrofitting of existing sugarcane harvesters, such that deflection of cane billets and other material within the cleaning chamber may be achieved.

The deflector body 210*a* may be generally formed from sheet metal or sheet plastic (and other components), although other materials may be possible. As depicted, the deflector body 210*a* is formed from separate pieces, with an extension body 240 and a support body 242, each of which includes a deflection surface. The extension body 240, for example, includes a deflection surface 244 on one side of the body 240. With the deflector body 210*a* mounted to the harvester 20 (see, e.g., FIG. 10), the deflection surface 244 generally faces the feed stream, and extends within the cleaning chamber 48 with an angle that generally aligns the plane of the deflection surface 244 with the hub cover 132.

The extension body 240 may include various mounting arrangements. As can be seen in FIGS. 11B and 11C, the extension body 240 includes a set of mounting holes 246 for securing the extension body 240 to the support body 242. The support body 242 may be also secured to the frame 232, such that the support body 242 supports the extension body 240 to cantilever an end portion 244*a* of the deflection surface 244 into the cleaning chamber 48.

Similarly to the deflector body 210, side mounting plates 224*a* attached to the deflector body 210*a* include fan-shaped end portions 226*a* with various mounting openings 228*a* configured to receive respective mounting pins. With this arrangement, the support body 242, the deflector body 210 and the deflection surface 244 may be disposed at different angles (e.g., relative to a rotational axis of the hub cover 132), depending on which of the openings 228 receives the mounting pin 230. For example, the side mounting plates 224*a* may be attached to the frame 232 with the pin 230 (see FIG. 10) extending into different of the openings 228*a*, depending on the desired angular orientation of the deflection surface 244.

Also similarly to the deflector body 210, mounting slots 222*a* are included in slotted arrangements on the side mounting plates 224*a* of the deflector body 210. By attaching the support body 242 to the frame 232 at different locations along the mounting slot 222*a* and attaching the extension body 240 to the support body 242, the end portion 244*a* of the deflection surface 244 may be adjusted to different extension distances within the cleaning chamber 48.

In some embodiments, the slots 222*a* may also be useful to allow relatively easy angular adjustments with the fanned mounting openings 228*a* of the plates 224*a*. For example, the ability to slide the body 242 along a bolt or other pin (not shown) through the slot 222*a* may allow for a mounting pin (e.g., the pin 230 of FIG. 10) to be moved between different openings 228*a*, without the need to fully remove the mounting pin or the bolt or other pin through the slot 222*a*.

In some embodiments, additional (or alternative) slotted arrangements may be provided on the extension body 240. As depicted in dotted relief in FIGS. 11B and 11C, for example, slots 248 may allow the extension body 240 to be secured to the support body 242 with various extension lengths, relative to the support body 242. Accordingly, the slots 248 may, like the slots 222*a*, allow adjustment of an extension distance of the deflection surface 244 within a cleaning chamber.

In some embodiments, the support body 242 may also include a deflection surface 250, which may be configured to generally face a feed stream (e.g., the feed stream 212 depicted in FIG. 10). In some embodiments, the support body 242 may be configured such that an end 252 of the support body 242 is generally aligned with (or somewhat short of) a perimeter of the cleaning chamber 48. As such, the deflection surface 250 may deflect cane billets and other material outside of the cleaning chamber 48, and may be configured to support, by deflections of the feed stream 212, favorable trajectories of the feed stream 212 into the cleaning chamber. In some embodiments, for example, the deflection surface 250 may be configured to deflect the feed stream 212 toward the hub cover 132 or other features of the extractor 50 or of the air flow within the cleaning chamber 48. Further deflection may then also be provided, within the cleaning chamber 48, by the deflection surface 244.

Other feature may also be included. For example, a series of mounting or alignment features, such as the fixed rods 254, may be included on the extension body 240 or the support body 242. Similarly, features such as a cross member 256 may be provided for structural support, for attachment of other components, and so on.

As also discussed above, guide vanes may be included in a trash extractor, such as the extractor 50. In some embodiments, the guide vanes may be configured to redirect the air flow within a cleaning chamber in particular ways. In some embodiments, the guide vanes may additionally (or alternatively) be configured to physically deflect cane billets and other material, in order to improve the cleaning of an incoming feed stream within the cleaning chamber.

Figure 12:
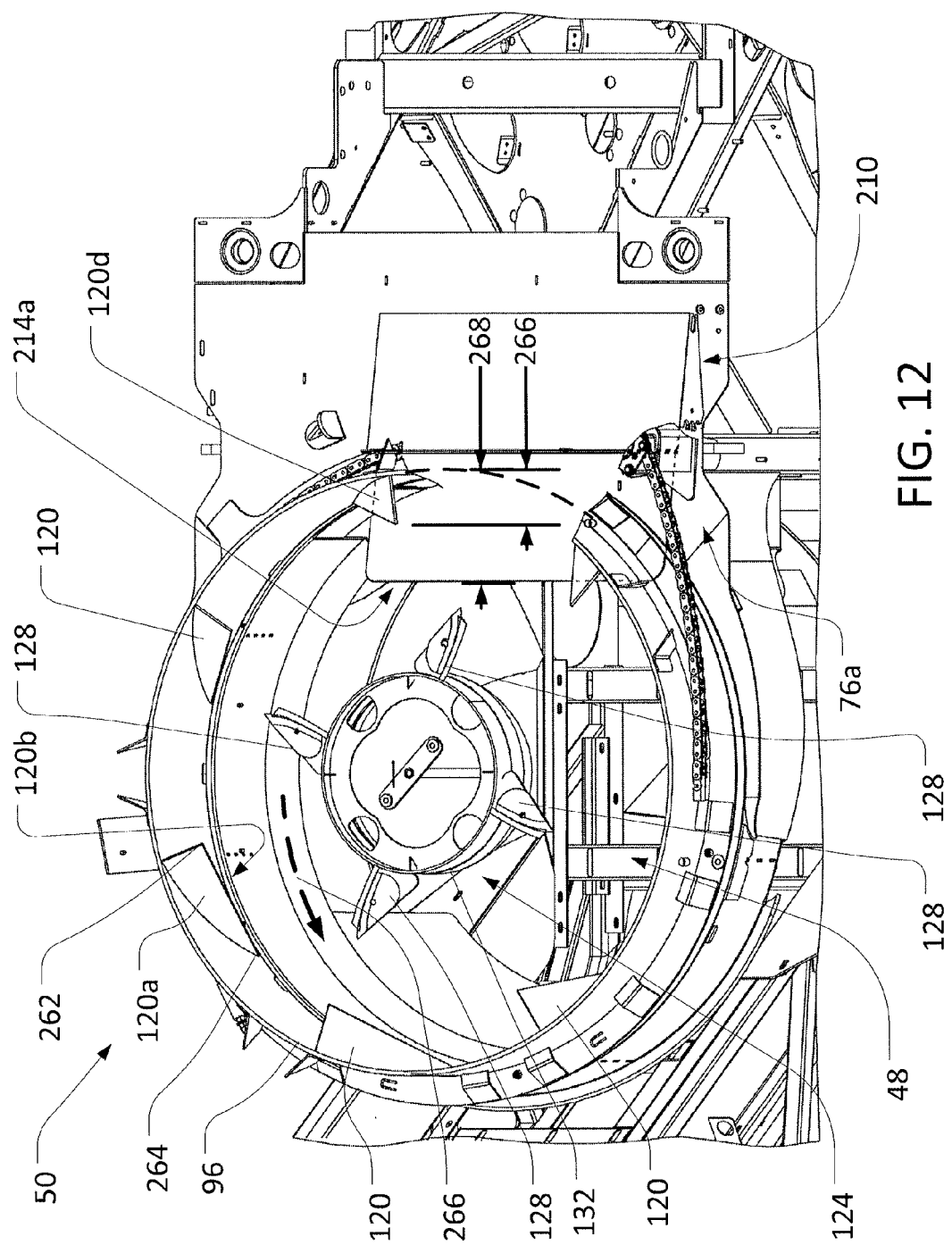
FIG. 12 is a perspective view of the trash extractor configuration of FIG. 9, taken from the top of the trash extractor, with certain components removed, along a plane A-A of FIG. 10, to show the deflector body.

As shown in FIG. 12, multiple instances of the guide vanes 120 for the trash extractor 50 may be disposed on an inner perimeter wall of the primary ring 96. As such, the guide vanes 120 may be disposed generally upstream of the fan blades 128 with respect to a bulk direction of the generated air flow (i.e., may be disposed below the fan blades in the cleaning chamber 48). In other embodiments, the guide vanes 120 (or other guide vanes) may be alternatively (or additionally) disposed generally downstream of the fan blades 128 (i.e., above the fan blades 128, as depicted) or in the same plane as the blades 128.

In some embodiments, each of the guide vanes 120 may be angled counter to the rotation of the fan blades 128. As depicted, for example, each of the guide vanes 120 may include an angled guide surface 120a that includes an upper end 262 and a lower end 264 and generally faces toward the fan assembly 124 and against a rotational direction 266 of the fan blades 128. As the fan blades 128 rotate cyclically in the direction 266, each fan blade 128 accordingly passes the upper end 262 of the guide surface 120a before passing the lower end 264 of the guide surface 120a. In this way, as the air flow generated by the fan blades 128 carries cane billets and other material upward within the cleaning chamber 48 (and counter-clockwise, as depicted), cane billets and other material traveling close to the inner perimeter of the ring 96 may be deflected downward within the cleaning chamber 48 by the guide vanes 120 (i.e., away from the hood 70, as depicted (see FIG. 10)). In some embodiments, the vanes 120 (or other vanes) may be angled with the rotation of the fan assembly 124, may vary in orientation from vane to vane (i.e., may not exhibit uniform pitch between different vanes 120) or across a guide (or impact) surface of a single vane, or may otherwise vary from the example configuration depicted in FIG. 12.

In other embodiments, as also noted above, guide vanes may be disposed at other locations with respect to the fan blades 128. In some embodiments, guide vanes positioned at these other locations may be similarly configured to deflect cane billets and other material away from an outlet of the cleaning chamber 48. For example, with guide vanes disposed above the fan blades 128 (not shown), a similarly pitched arrangement with respect to the fan blades 128 may be employed, with a lower guide (and impact) surface of each such guide vanes defining upper and lower ends such that the rotating fan blades pass the upper end of the guide surface before the lower end. Accordingly, such guide (and impact) surfaces may tend also to deflect cane billets and other material downward away from the hood 70.

In some embodiments, a deflector surface of a deflector body may be configured to extend into a cleaning chamber farther than one or more guide vanes. As depicted in FIG. 12, for example, the guide vanes 120 exhibit a generally uniform maximum extension away from the inner perimeter of the ring 96 into the cleaning chamber 48. At the inlet opening 76a, this extension of the guide vanes 120, for example, results in a guide vane 120d, which is vertically aligned with (but on a different plane from) the deflector body 210, extending an extension distance 268 from the perimeter of the ring 96 into the cleaning chamber 48. In some embodiments, including as depicted, the end 214a of the deflection surface 214 of the deflection body 210 may extend a larger extension distance 270, as also measured with respect to the ring 96. (As noted above, a deflection body may sometimes not extend into a cleaning chamber along the same plane (or planes) as a guide vane. Accordingly, whether a deflection body (or portion thereof) extends farther into a cleaning chamber than a guide vane may be measured with respect to a shared reference surface, feature, or plane (e.g., the ring 96 or the opening 76a) regardless of whether such surface, feature or plane is vertically aligned with both the deflection body and the relevant guide vane.)

Collectively, various of the features discussed herein (e.g., embodiments of the deflection bodies, guide vanes, hub covers, and so on) may form a cleaning arrangement that uses, at least in part, physical impacts between a feed stream and various features in order to improve separation of the feed stream into various components. It will be understood that such arrangements may include various features in various combinations. For example, example cleaning arrangements may include deflector bodies, with or without hub covers or guide vanes, may include hub covers with or without deflector bodies or guide vanes, may include guide vanes with or without deflector bodies or hub covers, and so on. Likewise, it will be understood that different arrangements, or different adjustments of similar arrangements, may be particularly beneficial for particular harvesting conditions and operations (e.g., for particular vehicle speeds, crop processing rates, feed stream characteristics, and so on).

Various adjustments and variations are discussed above with respect to cleaning arrangement with deflectors. For example, deflector bodies (or deflection surfaces) can be adjusted with respect to extension distance or angular orientation, and hub covers can be adjusted with respect to extension distances. In some implementations, such adjustments may correspond to particular field or other conditions. For example, particular angular or extension adjustments may be better suited to relatively high harvesting rates, whereas other angular or extension adjustments may be better suited to relatively low harvesting rates. Similarly, some adjustments may be particularly supportive of effective sugarcane cleaning (and other operations) for particular plant types, environmental conditions, speeds of vehicle travel, and so on.

As will be appreciated by one skilled in the art, certain aspects of the disclosed subject matter may be embodied as a method, system, (e.g., a work vehicle control system included in the harvester 20) or computer program product. Accordingly, certain embodiments may be implemented as hardware, as software (including firmware, resident software, micro-code, etc.) or as a combination of software and hardware aspects. Furthermore, certain embodiments may take the form of a computer program product on a computer-usable storage medium having computer-usable program code embodied in the medium.

Any suitable computer usable or computer readable medium may be utilized. The computer usable medium may be a computer readable signal medium or a computer readable storage medium. A computer-usable, or computer-readable, storage medium (including a storage device associated with a computing device or client electronic device) may be, for example, but is not limited to, an electronic, magnetic, optical, electromagnetic, infrared, or semiconductor system, apparatus, or device, or any suitable combination of the foregoing. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device. In the context of this document, a computer-usable, or computer-readable, storage medium may be any tangible medium that can contain, or store a program for use by or in connection with the instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be non-transitory and may be any computer readable medium that is not a computer readable storage medium and that can communicate, propagate, or transport a program for use by or in connection with an instruction execution system, apparatus, or device.

Aspects of certain embodiments are described herein with reference to flowchart illustrations and/or block diagrams of methods, apparatus (systems) and computer program products according to embodiments of the invention. It will be understood that each block of any flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instructions which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the disclosure. For example, the terms "upper," "lower," "vertical," and the like may be used with respect to the relative orientation of a particular embodiment, but may not be intended to limit the disclosure to that orientation nor embodiment. As used herein, the singular forms "a", "an" and "the" are intended to include the plural forms as well, unless the context clearly indicates otherwise. It will be further understood that any use of the terms "comprises" and/or "comprising" in this specification specifies the presence of stated features, integers, steps, operations, elements, and/or components, but do not preclude the presence or addition of one or more other features, integers, steps, operations, elements, components, and/or groups thereof.

The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. Explicitly referenced embodiments herein were chosen and described in order to best explain the principles of the disclosure and their practical application, and to enable others of ordinary skill in the art to understand the disclosure and recognize many alternatives, modifications, and variations on the described example(s). Accordingly, various other implementations are within the scope of the following claims.

What is claimed is:

1. A sugarcane cleaning arrangement for attachment to a sugarcane harvester, the sugarcane harvester including a cleaning chamber, a feed train to move a feed stream of cane billets and other material into the cleaning chamber, and a fan rotating about a rotation axis to create an air flow within the cleaning chamber to at least partly separate the cane billets from the other material, the sugarcane cleaning arrangement comprising:
    a deflector body, with at least one deflection surface of the deflector body at least partly facing the feed stream, the deflector body being fixed to the sugarcane cleaning arrangement such that the at least one deflection surface extends at least partly within the cleaning chamber;
    wherein, as the feed train moves the feed stream to the cleaning chamber, the at least one deflection surface deflects at least a portion of the feed stream within the cleaning chamber;
    wherein the deflection surface includes a substantially planar surface extending in a plane that crosses the cleaning chamber and intersects the rotation axis.

2. The sugarcane cleaning arrangement of claim 1, wherein the at least one deflection surface extends away from the cleaning chamber such that, as the feed train moves the feed stream to the cleaning chamber, the at least one deflection surface deflects the portion of the feed stream at least partly toward the cleaning chamber.

3. The sugarcane cleaning arrangement of claim 2, wherein the at least one deflection surface includes first and second deflection surfaces at least partly facing the feed stream; and
    wherein the deflector body includes:
        a first body extending at least partly outside of the cleaning chamber, the first body supporting the first deflection surface such that the first deflection surface extends at least partly outside of the cleaning chamber; and
        a second body extending at least partly within the cleaning chamber, the second body supporting the second deflection surface such that the second deflection surface extends at least partly within the cleaning chamber.

4. The sugarcane cleaning arrangement of claim 1, further including:
an external deflector body extending at least partly outside of the cleaning chamber to deflect the portion of the feed stream at least partly toward the cleaning chamber; and
a mounting arrangement configured to secure the deflector body to the external deflector body.

5. The sugarcane cleaning arrangement of claim 1, wherein the fan includes a hub cover, wherein the deflection surface is configured to direct the portion of the feed stream towards the hub cover, such that at least some of the portion of the feed stream physically impacts the hub cover.

6. The sugarcane cleaning arrangement of claim 5, wherein the deflection surface includes an end portion extending at an angle that is directed toward the hub cover.

7. The sugarcane cleaning arrangement of claim 5, wherein the deflection surface includes a substantially planar surface extending from a perimeter of the cleaning chamber towards the hub cover.

8. The sugarcane cleaning arrangement of claim 5, wherein the cleaning chamber includes a perimeter wall with a plurality of guide vanes extending at least a first distance from the perimeter wall, wherein the at least one deflection surface at least partly extends within the cleaning chamber past the first distance from the perimeter wall.

9. The sugarcane cleaning arrangement of claim 1, further including a mounting arrangement for the deflector body for moving the deflection surface between at least first and second characteristic angles.

10. The sugarcane cleaning arrangement of claim 1, further including a mounting arrangement for the deflector body for moving the deflection surface between at least first and second extension distances within the cleaning chamber.

11. The sugarcane cleaning arrangement of claim 10, further including:
an external deflector body extending at least partly outside of the cleaning chamber to deflect the portion of the feed stream at least partly toward the cleaning chamber; and
a mounting arrangement configured to secure the deflector body to the external deflector body with at least first and second orientations that correspond, respectively, to the at least first and second extension distances of the deflection surface.

12. A sugarcane cleaning arrangement for attachment to a sugarcane harvester, the sugarcane harvester including a cleaning chamber, a feed train to move a feed stream of cane billets and other material into the cleaning chamber, and a fan to create an air flow within the cleaning chamber to at least partly separate the cane billets from the other material, the sugarcane cleaning arrangement comprising:
a deflector body extending at least partly within the cleaning chamber, the deflector body including at least one deflection surface that at least partly faces the feed stream, the at least one deflection surface being configured to deflect at least a portion of the feed stream along a deflected path within the cleaning chamber; and
a hub cover for the fan, the hub cover extending within the cleaning chamber, with at least a portion of the hub cover extending into the deflected path of the feed stream;

wherein the deflection of the portion of the feed stream by the deflector body causes the portion of the feed stream to physically impact the hub cover.

13. The sugarcane cleaning arrangement of claim 12, wherein at least part of the deflected path extends directly between an inner end of the deflection surface and the hub cover.

14. The sugarcane cleaning arrangement of claim 12, further comprising:
a plurality of guide vanes oriented around a perimeter of the cleaning chamber.

15. The sugarcane cleaning arrangement of claim 14, wherein the fan rotates fan blades to generate the air flow, wherein the plurality of guide vanes are at least partly disposed upstream of the fan blades, with respect to the air flow.

16. The sugarcane cleaning arrangement of claim 14, wherein the fan rotates fan blades to generate the air flow, wherein at least one of the guide vanes includes a guide surface that at least partly faces the fan blades, the guide surface being oriented such that one of the rotating fan blades, in a single rotation, passes a first end of the guide surface before passing a second end of the guide surface, the first end of the guide surface being disposed higher than the second end of the guide surface, within the cleaning chamber.

17. The sugarcane cleaning arrangement of claim 12, wherein the hub cover is configured to be adjustable between at least first and second extension distances within the cleaning chamber.

18. The sugarcane cleaning arrangement of claim 12, further including a mounting arrangement for the deflector body for moving the deflection surface between at least first and second extension distances within the cleaning chamber.

19. The sugarcane cleaning arrangement of claim 12, further including a mounting arrangement for the deflector body for moving the deflection surface between at least first and second characteristic angles.

20. A sugarcane cleaning arrangement for attachment to a sugarcane harvester, the sugarcane harvester including a cleaning chamber, a feed train to move a feed stream of cane billets and other material into the cleaning chamber, and a fan rotating fan blades in a first direction to create an air flow within the cleaning chamber to at least partly separate the cane billets from the other material, the sugarcane cleaning arrangement comprising:
a deflector body extending at least partly within the cleaning chamber, the deflector body including at least one deflection surface that at least partly faces the feed stream, the at least one deflection surface being configured to deflect a first portion of the feed stream along a deflected path within the cleaning chamber;
a hub cover for the fan, the hub cover extending within the cleaning chamber, with at least a portion of the hub cover extending into the deflected path of the feed stream; and
a guide vane disposed at a perimeter of the cleaning chamber, the guide vane including a guide surface that at least partly faces the fan blades, the guide surface being oriented such that one of the rotating fan blades, in a single rotation, passes a first end of the guide surface before passing a second end of the guide surface, the first end of the guide surface being disposed higher than the second end of the guide surface, within the cleaning chamber;

wherein, the deflection of the first portion of the feed stream by the deflector body causes the first portion of the feed stream to physically impact the hub cover; and wherein, as a second portion of the feed stream is carried by the air flow toward an outlet of the cleaning chamber, at least one of the guide surface of the guide vane and an impact surface of the guide vane deflects the second portion of the feed stream away from the outlet.

* * * * *